(12) United States Patent
Oda

(10) Patent No.: US 6,448,557 B2
(45) Date of Patent: Sep. 10, 2002

(54) THERMAL INFRARED DETECTOR PROVIDED WITH SHIELD FOR HIGH FILL FACTOR

(75) Inventor: Naoki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/771,879

(22) Filed: Jan. 30, 2001

(30) Foreign Application Priority Data

Jan. 31, 2000 (JP) ........................................ 2000-022862

(51) Int. Cl.⁷ ................................................. G01J 5/20
(52) U.S. Cl. ................... 250/338.3; 250/330; 250/332; 250/338.4; 250/339.02; 250/338.1
(58) Field of Search ................................. 250/330, 332, 250/338.4, 339.02, 338.1, 338.3; 136/224

(56) References Cited

U.S. PATENT DOCUMENTS 6,031,231 A * 2/2000 Kimata et al. ............... 250/332

FOREIGN PATENT DOCUMENTS

| JP | 7-509057 | 10/1995 |
| JP | 10-185681 | 7/1998 |
| JP | 10-209418 | 8/1998 |
| WO | 94-01743 | 1/1994 |

OTHER PUBLICATIONS

G.W. Cleek, "The Optical Constants of Some Oxide Glasses in the Strong Absorption Region", Applied Optics, vol. 5, No. 5, (May 1966), pp. 771–776.

T. Ishikawa et al., "Low–cost 320×240 uncooled IRFPA using conventional silicon IC process", SPIE Conference on Infrared Technology and Applications XXV, vol. 3698, pp. 556–564 with Abstract.

H. Baltes et al., "Thermal Sensors Fabricated by CMOS and Micromachining", Sensors and Materials, vol. 8, No. 6, (1996), pp. 409–421.

P.W. Kruse et al., "Uncooled Infrared Imaging Arrays and Systems", Semiconductors and Semimetals, vol. 47, pp. 29–30.

* cited by examiner

Primary Examiner—Constantine Hannaher
Assistant Examiner—Timothy Moran
(74) Attorney, Agent, or Firm—Sughrue Mion, PLLC

(57) ABSTRACT

An infrared photosensitive area is constituted by an infrared ray absorbing part that is heated by infrared rays, a thermal detector that detects the temperature change of the infrared ray absorbing part, and electrodes that are electrically connected to the thermal detector. The infrared photosensitive area is held up above one surface of a substrate by supports. The electrodes of the infrared photosensitive area are electrically connected to contact pads on the substrate by wiring material that constitutes the support. A shield projects from portions of the infrared ray absorbing part other than portions that correspond to the electrodes. The contact pads of the substrate and the surfaces of the electrodes and the supports that are directed away from the substrate are covered by the shield with an interposed space. This configuration enables an increase in the fill factor of the picture elements of the thermal infrared detector and enables greater absorption of infrared light.

28 Claims, 23 Drawing Sheets

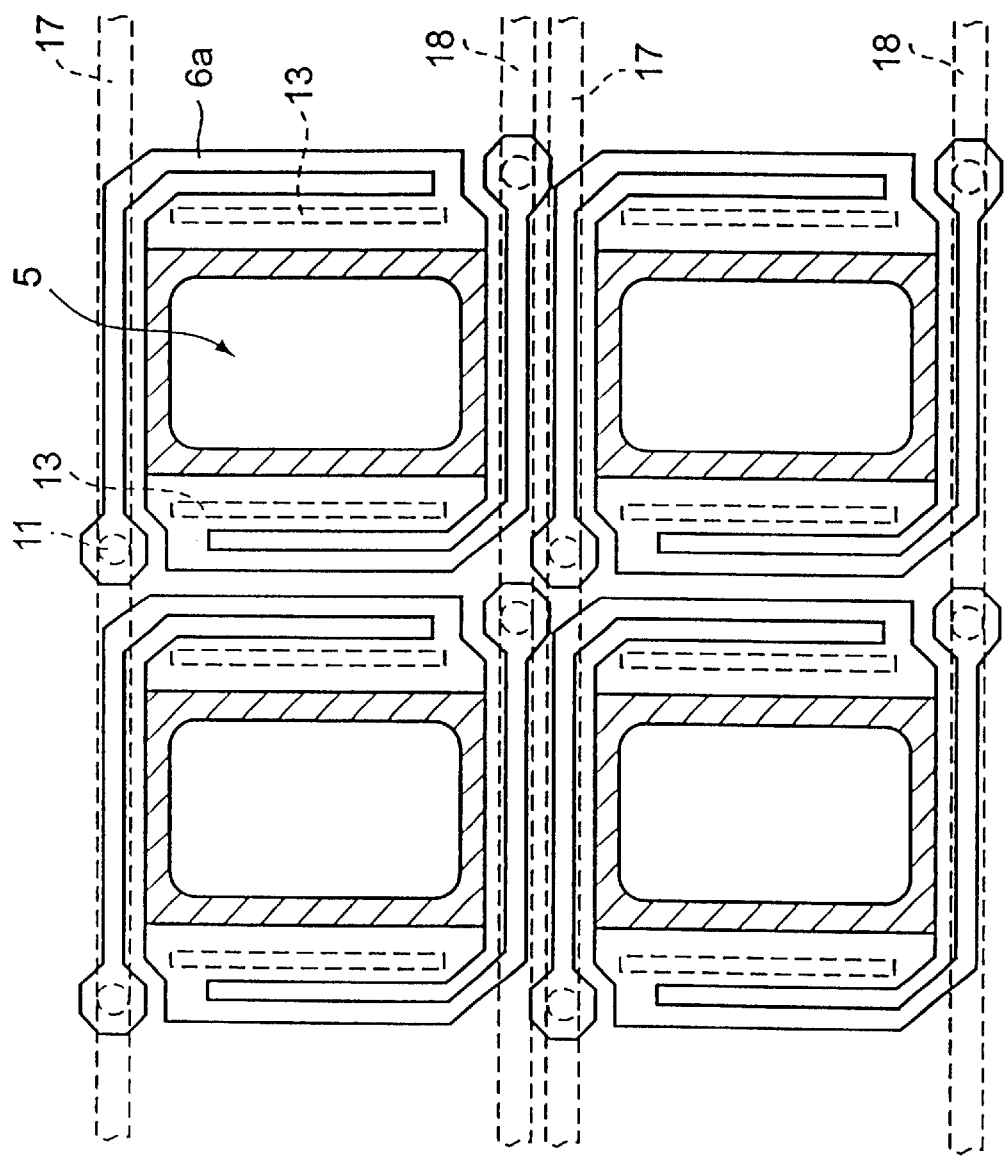

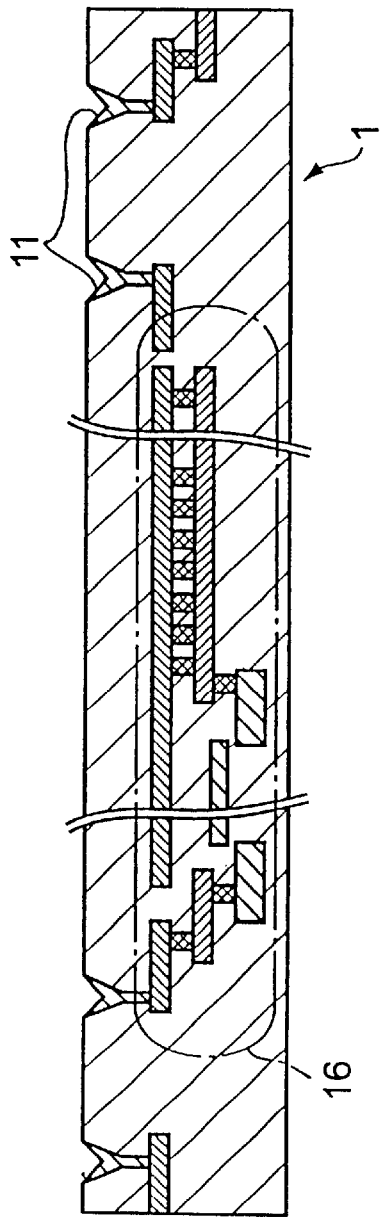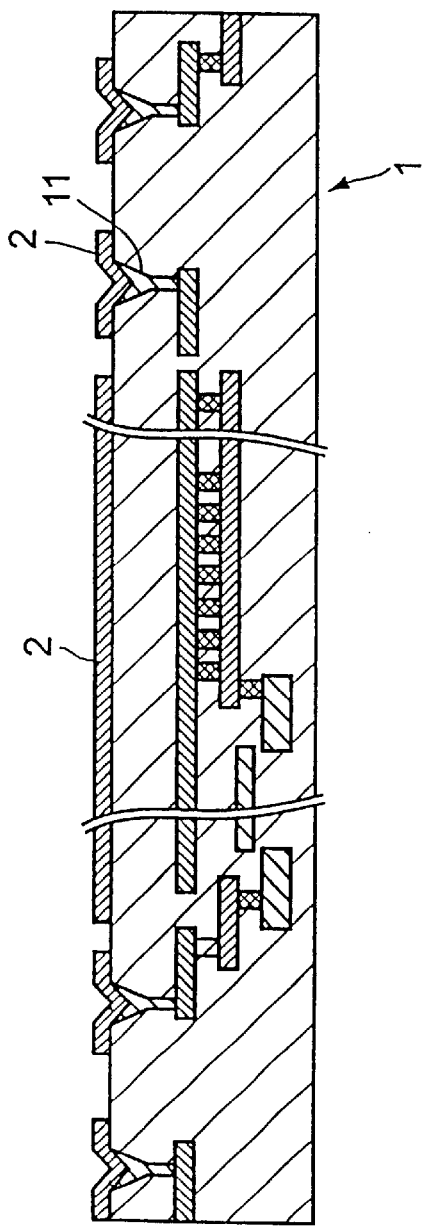

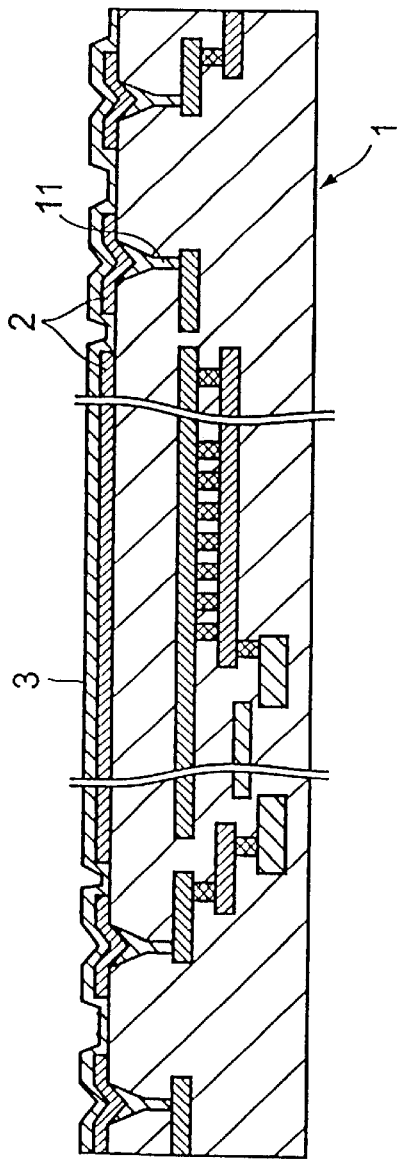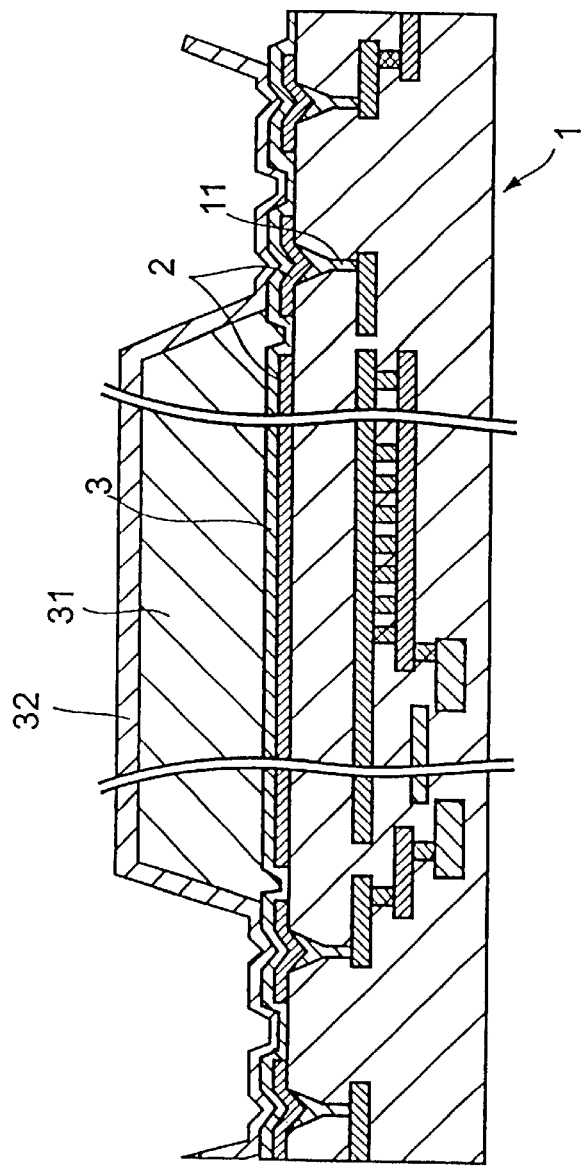

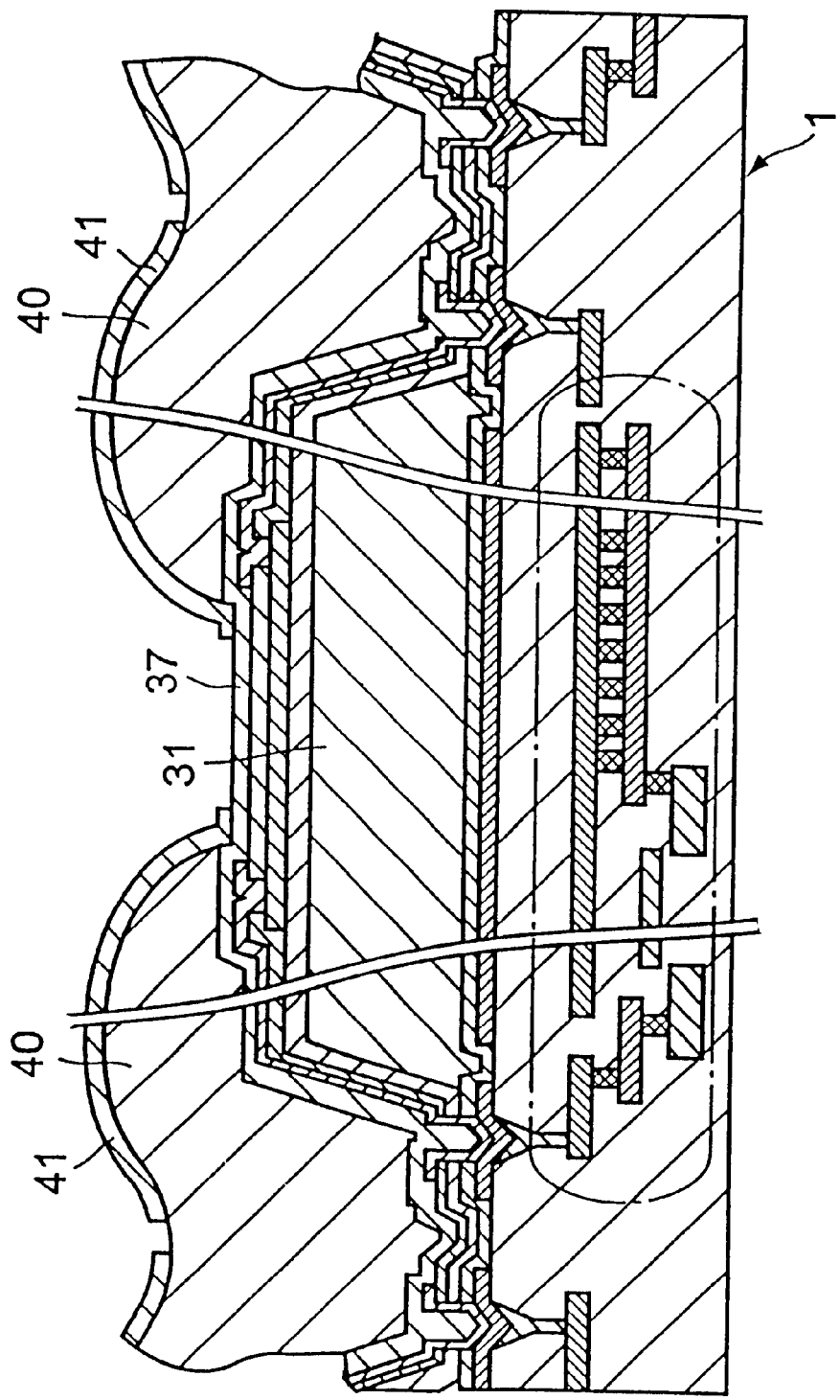

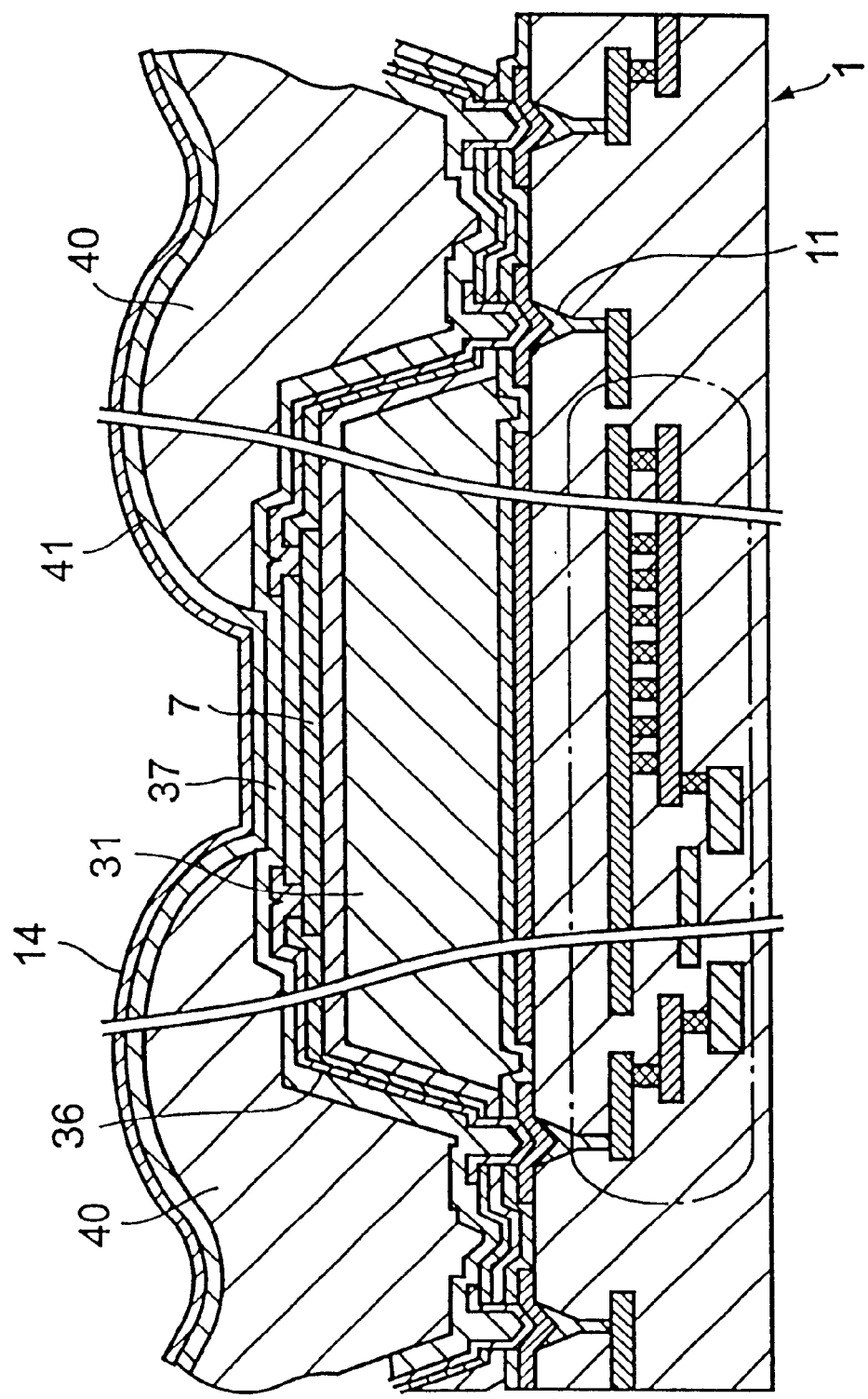

US 6,448,557 B2

THERMAL INFRARED DETECTOR PROVIDED WITH SHIELD FOR HIGH FILL FACTOR

BACKGROUND OF THE INVENTION

1. Field of the Invention

The present invention relates both to a thermal infrared detector having a high fill factor and a construction in which a photosensitive area that receives infrared light is held above the substrate with a space interposed by beams, i.e., having a thermal isolation structure, and to a method of fabricating the detector.

2. Description of the Related Art

Various configurations have been proposed for improving the fill factor of a thermal infrared detector having a thermal isolation structure, including the configuration of the infrared ray solid-state imaging device disclosed in Japanese Patent Laid-open Publication No. 209418/98 by Kimata et al. and the configuration of the thermal infrared detector array disclosed in the paper by Ishikawa et al. ("Low-cost 320×240 uncooled IRFPA (Infrared Focal Plane Array) using a conventional silicon IC process"; SPIE Vol. 3698, 1999, pp. 556–564). Referring to FIG. 1, the two-dimensional infrared solid-state imaging device described in Japanese Patent Laid-open Publication No. 209418/98 is shown as an example of a prior-art thermal infrared detector having a thermal isolation structure. FIG. 1 shows a sectional view taken along the current path in one picture element of the two-dimensional infrared solid-state imaging device.

First, regarding the thermal infrared detector shown in FIGS. and 2, a concavity that is to become cavity 104 is formed on the surface of silicon substrate 100 as shown in FIG. 1. Beams 102 and 103 composed of dielectric films 108 and 109 laminated on the surface of silicon substrate 100 overlay cavity 104. Each of dielectric films 108 and 109 is several hundred nanometers thick, and beams 102 and 103 are approximately 1 μm thick, i.e., the sum of the thicknesses of the dielectric films on silicon substrate 100. The width of each of beams 102 and 103 is on the order of 1–3 μm.

Each of beams 102 and 103 supports thermal detector 105, which includes thermistor bolometer thin-film 101, and holds thermal detector 105 above cavity 104. Each of these dielectric films 108 and 109 is composed of a material such as a silicon nitride film or a silicon oxide film having high thermal resistance, and each dielectric film controls the flow of heat from thermal detector 105 to silicon substrate 100. These two dielectric films 108 and 109 constitute the mechanical structure of beams 102 and 103 and thermal detector 105 and support thermal detector 105.

Metal wiring 106 and 107 is formed between dielectric films 108 and 109. One end of each of metal wiring 106 and 107 is connected to thermistor-bolometer thin-film 101. The other end of metal wiring 106 is electrically connected to signal line 202, which is provided on silicon substrate 100 as shown in FIG. 2, by way of contact 110 that is formed on dielectric film 109. Signal line 202 provided on silicon substrate 100 has been omitted in FIG. 1. The other end of metal wiring 107 is electrically connected to signal read-out circuit 201 by way of contact 111 formed on dielectric film 109. In other words, thermistor-bolometer thin-film 101 is electrically connected to signal read-out circuit 201 by way of metal wiring 106 and 107 and contacts 110 and 111. Signal read-out circuit 201, which is provided in silicon substrate 100, is omitted in FIG. 1.

Infrared ray absorbing part 112 is joined to the surface of thermal detector 105 that is directed away from cavity 104 by way of junction pillar 113. Infrared ray absorbing part 112 is a component for absorbing infrared rays and converting these rays to heat, and is constituted by a silicon nitride film or a silicon oxide film, or by a lamination of these films. Junction pillar 113 both keeps infrared ray absorbing part 112 separated from thermal detector 105 and thermally links infrared ray absorbing part 112 and thermal detector 105. Similar to infrared ray absorbing part 112, junction pillar 113 is constituted by a silicon nitride film or a silicon oxide film, or by a lamination of these films. The dimensions of junction pillar 113 are preferably, for example, several μm thick and 1–2 μm long, and junction pillar 113 may be of any shape.

Upon irradiation of infrared rays onto the infrared ray absorbing part in a thermal infrared detector, the infrared rays are absorbed into the infrared ray absorbing part, causing the temperature of the infrared ray absorbing part to rise. The infrared rays that have been irradiated upon the infrared ray absorbing part are then detected by sensing the temperature change of the infrared ray absorbing part. The thermal infrared detector of the prior art shown in FIGS. 1 and 2 is thus mainly constituted by, infrared ray absorbing part 112 and thermal detector 105. In this thermal infrared detector, the temperature change brought about in infrared ray absorbing part 112 by the infrared rays that are incident to infrared ray absorbing part 112 are conveyed to thermal detector 105 by way of junction pillar 113. The change in temperature of infrared ray absorbing part 112 is then detected by detecting change in the characteristics of thermal detector 105 that is caused by the temperature change, which in concrete terms is the change in electrical resistance of thermistor-bolometer thin-film 101 shown in FIGS. 1 and, 2.

FIG. 2 shows one entire picture element 200 and one portion of signal read-out circuit 201. Signal read-out circuit 201 that is established in picture element 200 is constituted by a MOS transistor or a diode. Contact 205 is formed in this signal read-out circuit 201. This contact 205 is connected by way of metal wiring 204 to contact 206, which is formed in control clock bus line 203. Control clock bus line 203 is provided for controlling signal read-out circuit 201. Metal wiring 106, on the other hand, is connected to signal line 202 by way of contact 110.( signal line 202 is provided for reading out signals from thermal detector 105.

FIG. 3 shows another example of a thermal infrared detector described in Japanese Patent Laid-open Publication No. 209418 in which thermal detector 301 is arranged above, and separated by the distance of cavity 302 from, silicon substrate 300. Thermistor-bolometer thin-film 303 is provided in thermal detector 301, thermistor-bolometer thin-film 303 being surrounded by dielectric protective films 304 and 305. Thermal detector 301 is supported above silicon substrate 300 by beams 306 and 307.

Thermistor-bolometer thin-film 303 is connected to a signal read-out circuit (not shown in the figure) in silicon substrate 300 by metal wiring 308 and 309, each of which is formed for carrying current, and contacts 311 and 312 formed on dielectric protective film 305 and dielectric film 310. Metal wiring 308 and 309 is enclosed by dielectric protective films 304 and 305.

A photosensitive area, which is composed by sandwiching infrared ray absorbing part 315 between metal reflecting film 313 and infrared ray absorbing film 316, also made of metal, is link e d by way of junction pillar 314 to the surface of thermal detector 301 that is directed away from silicon substrate 300. Junction pillar 314 is formed as a single unit with metal reflecting film 313. Infrared ray absorbing part 315 and metal infrared ray absorbing film 316 are laminated in that order on the surface of metal reflecting film 313 that is directed away from junction pillar 314. A three-layer optical resonation structure is thus constituted by metal reflecting film 313, infrared ray absorbing part 315, and metal infrared ray absorbing film 316.

If $\lambda$ is the wavelength of the infrared light that is to be detected by the thermal infrared detector and n is the refractive index of infrared ray absorbing part 315, the thickness of infrared ray absorbing part 315 is expressed by $\lambda/(4n)$. The reflectance of infrared rays on metal reflecting film 313 is preferably 100%, and the sheet resistance of metal infrared ray absorbing film 316 is preferably on the order of 377Ω. By satisfying these conditions, infrared light of wavelength $\lambda$ is effectively absorbed and converted to heat by the optical resonation structure such as shown in FIG. 3. The converted heat is conveyed through junction pillar 314 to thermistor-bolometer thin-film 303 and is thereby changed to the resistance of thermistor-bolometer thin-film 303. Change in the resistance of thermistor-bolometer thin-film 303 is converted to voltage change by the signal read-out circuit of silicon substrate 300, outputted as an electrical signal, and this electrical signal is then converted to an image by an outside circuit.

As shown in FIG. 4, a concavity that is to become cavity 402 is formed on the surface of SOI (Silicon on insulator) silicon substrate 400 in the thermal infrared detector array described in the above-mentioned paper by Ishikawa et al. (SPIE Vol. 3698, 1999, pp. 556–564). Thermal detector 401 is arranged over this cavity 402. Thermal detector 401 is held by beams 405 above, and separated by the space of cavity 402 from, the bottom surface of cavity 402, i.e., separated from SOI silicon substrate 400.

Silicon diodes 403 are formed in a series on the SOI film of thermal detector 401, and silicon diodes 403 are surrounded by dielectric protective film 404. Embedded oxide film 413 is present on SOI silicon substrate 400. Silicon diodes 403 are electrically connected to signal line 407 on SOI silicon substrate 400 and to signal read-out circuit (not shown in the figure) in SOI silicon substrate 400 by metal wiring 406 that is formed in beam 405 for conveying current to silicon diodes 403. Metal wiring 406 is surrounded by dielectric film 408.

A structure composed by laminating infrared ray reflecting film 409, dielectric film 411, and infrared ray absorbing film 412 in that order is joined to the surface of thermal detector 401 that is directed away from SOI silicon substrate 400.

Of the structure that is formed by laminating infrared ray reflecting film 409, dielectric film 411, and infrared ray absorbing film 412, the portion at which thermal detector 401 is joined constitutes junction pillar 410 that projects toward thermal detector 401. The surface of infrared ray reflecting film 409 at junction pillar 410 contacts thermal detector 401. Infrared ray reflecting film 409, dielectric film 411, and infrared ray absorbing film 412 constitute an optical resonation structure of three-layer construction.

If $\lambda$ is the wavelength of infrared light that is to be detected by the thermal infrared detector (in concrete terms, the 8–12 $\mu$m region) and n is the refractive index of dielectric film 411, the thickness of dielectric film 411 is represented by $\lambda/(4n)$. Dielectric film 411 is constituted by a silicon oxide film and a silicon nitride film. The infrared reflectance of infrared ray reflecting film 409 is preferably 100%, and the sheet resistance of infrared ray absorbing film 412 is preferably on the order of 377 Ω. By satisfying these conditions, infrared light of wavelength $\lambda$ can be effectively absorbed and converted to heat by an optical resonation structure such as shown in FIG. 4. The converted heat is conveyed through junction pillar 410 to silicon diodes 403, and the current-voltage characteristics at silicon diodes 403 are changed by the conveyed heat. The change in the current-voltage characteristics at silicon diodes 403 is converted to a change in voltage by the signal read-out circuit and outputted as an electrical signal, and this electrical signal is converted to an image by an outside circuit.

The sensitivity of a thermal infrared detector increases with the degree of thermal isolation between the thermal detector and substrate. In the case of the infrared detector that is described in the above-cited paper by Ishikawa et al., the thermal conductance is as low as $8.2\times10^{-8}$ W/K, and a high sensitivity can be expected.

Referring now to FIGS. 5 and 6, in the thermal infrared detector described in Japanese Patent Laid-open Publication No. 185681/98 by Kimura et al., infrared photosensitive area 510 is supported above semiconductor substrate 504 by two beams 501, first column 502, and second column 503. As shown in FIG. 6, polycrystalline silicon film 511, which is a pn-junction thermistor, is formed on infrared photosensitive area 510. Infrared photosensitive area 510 is constituted by an infrared ray absorbing layer for absorbing the energy of incident infrared light and a thermo-electric conversion layer that functions as a detector. This thermo-electric conversion layer electrically detects the change in a physical value (for example, resistance) that is caused by the rise in temperature that is in turn brought about by the absorption of infrared energy in the infrared ray absorbing layer.

Each of the two beams 501 is formed as a plate with an L-shaped planar shape and is arranged between infrared photosensitive area 510 and semiconductor substrate 504. Impurity diffusion layer 504a that is formed in portions of the surface layer of semiconductor substrate 504 and one end of beam 501 are connected by first column 502; and the other end of beam 501 and infrared photosensitive area 510 are connected by second column 503. The supports are constituted by beam 501, first column 502 and second column 503. Infrared photosensitive area 510 is supported by these supports above semiconductor substrate 504 with an interposed gap M of prescribed height h shown in FIG. 6. Beam 501, first column 502 and second column 503 are thus arranged below infrared photosensitive area 510.

As shown in FIG. 6, infrared photosensitive area 510 is made up by: polycrystalline silicon film 511 and silicon nitride films 512, 513, and 514 that cover the surface of polycrystalline silicon film 511. Silicon nitride is composed of a material that easily absorbs infrared rays, and silicon nitride films 513 and 514 that are formed on the upper surface of polycrystalline silicon film 511 therefore determine the essential size (area) of the infrared ray absorbing layer on infrared photosensitive area 510.

An n-type diffusion layer and p-type diffusion layer are formed on polycrystalline silicon film 511, and this n-type diffusion layer and p-type diffusion layer constitute a pn-junction thermistor. In addition, through-hole 524 is provided at a prescribed position of infrared photosensitive area 510, and high-concentration impurity diffusion layer (conductor) 51 a is formed so as to surround through-hole 524. This high-concentration impurity diffusion layer 511a is electrically connected to the above-described pn-junction thermistor.

Each of two beams 501 is constituted by titanium film 515 and silicon nitride films 516 and 517 that cover titanium film 515, as shown in FIG. 6. of these films, one end of titanium film 515 is electrically connected to impurity diffusion layer 504a that is formed on semiconductor substrate 504. In addition, opening 517a is provided on silicon nitride film 517 that covers titanium film 515; and at this opening 517a, the other end 515b of titanium film 515 is electrically connected by way of aluminum film 518 to high-concentration impurity diffusion layer (conductor) 511a that is formed on polycrystalline silicon film 511. The conductive portion (or semiconductive portion) of infrared photosensitive area 510 and impurity diffusion layer 504a of semiconductor substrate 504 are thus electrically connected by way of titanium film 515 and aluminum film 518.

One end 515a of titanium film 515 functions as first column 502 (and a conductor), and aluminum film 518 functions as column 503 (and a conductor). Aluminum film 518 is formed on the inner walls of through-hole 524 so as to connect to high-concentration impurity diffusion layer 511a at through-hole 524. The outer surface and inner surface of aluminum film 518 are covered by silicon nitride films 514 and 513 as protective films.

When infrared light is irradiated upon infrared photosensitive area 510 in this type of thermal infrared detector, the incident infrared rays are absorbed into the infrared ray absorbing part of infrared photosensitive area 510 and converted to heat. A physical value (for example, resistance) of the detector portion of infrared photosensitive area 510 then changes in accordance with the amount of converted heat. As described hereinabove, beams 501 are arranged below infrared photosensitive area 510 and substantially parallel to infrared photosensitive area 510. In addition, first column 502 and second column 503 that together with beams 501 constitute the support structure are arranged below infrared photosensitive area 510. The support structure that is made up by beams 501, first column 502, and second column 503 is therefore covered by infrared photosensitive area 510 when viewed from the direction of incidence of infrared light (from above in FIG. 6), thereby enabling an increase in the proportion (the fill factor) of the area occupied by infrared photosensitive area 510 and allowing an improvement in thermal resolution.

The thermal infrared detectors described in the above-described Japanese Patent Laid-open Publication No. 209418/98 and the paper by Ishikawa et al. (SPIE Vol. 3698, 1999, pp. 556–564) have low thermal conductance and a high fill factor and thus can be expected to have high sensitivity. A thermal time constant sufficiently lower than 30 msec is necessary to obtain real-time imaging (a frame rate of at least 30 Hz) using a thermal infrared detector array. In each of the thermal infrared detectors shown in FIGS. 1–6, the thermal time constant (τh) can be represented by the ratio of the thermal capacity (H) of the thermal detector and infrared ray absorbing part to the thermal conductance ($G_{th}$) of the thermal isolation structure, as shown in the following equation (1):

$$\tau h = H/G_{th} \qquad (1)$$

In each of the thermal infrared detectors of the above-described prior art, the thermal time constant can be expected to be considerably greater than 30 msec as explained hereinbelow, and "persistence of vision" can therefore be expected to pose a serious problem in real-time imaging.

In the case of the thermal infrared detector disclosed in the previously described paper by Ishikawa et al. (SPIE Vol. 3698, 1999, pp. 556–564), the thermal conductance value was described to be $8.2 \times 10^{-8}$ W/K, but no mention was made of thermal capacity. It can be understood from the SEM photograph in this paper that the size of the thermal detector is approximately 17×23 μm. Although no mention is made of thermal conductance in the publication by Kimata et al. (Japanese Patent Laid-open Publication No. 209418/98), which is the same group as the above-described Ishikawa et al., the thickness of the thermal detector can be estimated to be approximately 1 μm based on the thickness of the beams, and the thermal capacity of the thermal detector can therefore be calculated. In addition, the thermal capacity of the infrared ray absorbing part for the optical resonation structure of Ishikawa et al. is calculated based on the values of the refractive indices of the silicon oxide film and silicon nitride film in the wavelength band of 8–12 μm and the specific heat at constant volume of the two materials. As described in the paper by Given W. Cleek ("The Optical Constants of Some Oxide Glasses in the Strong Absorption Region"; Applied Optics, vol. 5, No. 5, 1966, p, 771), the refractive index of silicon oxide film for infrared light in the 8–12 μm wavelength region is in the range 0.51–3.38 and a unique absorption occurs at the 9.5 μm wavelength region, and it is therefore difficult to determine a representative refractive index in the same wavelength region. Referring to FIG. 7 shown on p. 774 of the above-described paper by Given W. Cleek, however, 1.5 was used as the refractive index of a silicon oxide film for infrared light of the 8–12 μm wavelength region. The refractive index of a silicon nitride film in the 8–12 μm wavelength region is calculated as 1.9 based on the data for reflectance of a silicon nitride film shown in FIG. 7 of published Japanese translations of PCT International Publication No. 509057/95 by B. E. Cole. Depending on the method of film growth, the specific heat at constant volume of a siliconoxide film ranges from 1.05 J/cm³. K (Henry Baltes and Oliver Paul, "Thermal sensors Fabricated by CMOS and Micromachining"; Sensors and Materials, vol. 8, 1996, pp. 409–421) to 2.27 J/cm³·K (R. A. Wood, "Monolithic Silicon Microbolometer Arrays" in "Uncooled Infrared Imaging Arrays and Systems," Semiconductors and Semimetals, Volume 47, volume editors Paul W. Kruse and David D. Skatrud, Academic Press, 1997, p. 99). No data can be found for the specific heat at constant volume of a silicon nitride film. The thermal capacity is calculated using the value 1.7 J/cm³·K for both materials.

First, the thickness of dielectric film 411 of the infrared ray absorbing part is estimated to be 1.3–1.7 μm based on the values of the refractive index of a silicon oxide film and a silicon nitride film for the 8–12 μm wavelength region. If it is considered that the fill factor of the thermal infrared detector array of Ishikawa et al. is 90%, the thermal capacity of each of thermal detector 401 and the infrared ray absorbing parts (409, 411, and 412) are $6.6 \times 10^{-10}$ J/K and $(3.2–4.2) \times 10^{-9}$ J/K, respectively, making the total thermal capacity $(3.9–4.8) \times 10^{-9}$ J/K. The thermal time constant of the thermal infrared detector array of Kimata et al. and Ishikawa et al. is estimated to be 47–58 msec based on these values and on the value of thermal conductance $8.2 \times 10^{-8}$ W/K, and persistence in real-time imaging is therefore judged to be problematic.

Next, in a case in which the infrared ray absorbing part is constituted by only dielectric film 411 composed of a silicon nitride film having a thickness of 500 nm and infrared ray reflecting film 409 composed of a titanium film having a thickness of 150 nm, the thermal capacity of the infrared ray absorbing part is $1.7 \times 10^{-9}$ J/K and the thermal time constant is calculated to be 30 msec. However, persistence is judged to be a problem because the thermal time constant still does not differ significantly from the television frame rate of 30 Hz (a time interval of 33 msec).

In the case of the thermal infrared detector of Japanese Patent Laid-open Publication No. 185681/98, first column 502 and second column 503 are necessary due to the three-layer structure of infrared photosensitive area 510, beam 501, and semiconductor substrate 504. The problem of poor contact of the conductive material therefore tends to arise. There is also the problem that the portion directly above and in the vicinity of second column 503 functions as the electrode of the thermistor, and the fill factor is therefore correspondingly reduced.

SUMMARY OF THE INVENTION

It is an object of the present invention to provide a thermal infrared detector that can realize an increase in sensitivity and raise the fill factor while at the same time bringing about almost no increase in the thermal time constant, and to provide a fabrication method of such a thermal infrared detector.

According to one aspect of the present invention, infrared light is irradiated upon an infrared ray absorbing part of an infrared photosensitive area that is held up above one surface of a substrate by supports and upon a shield that projects from the infrared ray absorbing part, whereby at least a portion of the incident infrared light is absorbed by the infrared ray absorbing part and shield to heat these components. The heat of the infrared ray absorbing part is conveyed to a thermal detector of the infrared photosensitive area and the heat of the shield is also conveyed through the infrared ray absorbing part to the thermal detector, whereby the temperature of the thermal detector changes. The change in temperature of the thermal detector is transmitted as a signal to, for example, a signal read-out circuit by way of electrodes that are electrically connected to the thermal detector, the wiring of the support, and contact pads of the substrate, and this signal is converted to an electrical signal by the signal read-out circuit. The temperature change of the thermal detector is then converted to an infrared image by, for example, an outside circuit based on the electrical signal. Here, the fill factor of each picture element of the thermal infrared detector can be increased and more infrared light can be absorbed by causing the shield to project from the infrared ray absorbing part of the infrared photosensitive area such that this shield covers the surface of the electrodes that is directed away from the substrate with a space interposed between the electrodes and the shield. This configuration enables an increase in the sensitivity of the thermal infrared detector. Furthermore, arranging the base of the shield in proximity to the edge of the infrared photosensitive area can make the thermal time constant sufficiently lower than the time interval of 33 msec that corresponds to the television frame rate, while bringing about almost no increase in thermal capacity. In other words, the present invention realizes a thermal infrared detector that is capable of real-time infrared imaging with higher sensitivity.

In addition, the shield that projects from the infrared ray absorbing part preferably covers the surfaces of the supports that are directed away from the substrate and contact pads with an interposed space between the shield and both the supports and the contact pads of the substrate. This configuration can further increase the fill factor of each picture element in the thermal infrared detector and realize greater absorption of infrared light.

According to another aspect of the present invention, the shield projects from portions other than portions that correspond to the electrodes in the infrared ray absorbing part of the infrared photosensitive area; such that this shield covers the supports and the contact pads of the substrate. This configuration enables an increase in the fill factor of each picture element of the thermal infrared detector and increases the absorption of infrared light. Here, the heat of the shield can be prevented from escaping to the substrate by way of the electrodes and wiring of the supports by causing the shield to project from portions of the infrared ray absorbing part other than the portion corresponding to electrodes. This configuration therefore prevents deterioration in the sensitivity of the thermal infrared detector.

Each of the above-described thermal infrared detectors preferably further includes: an infrared ray reflecting film that is formed on the surface of the substrate that is directed toward the infrared photosensitive area, and a first dielectric protective film that is formed on the surface of the infrared ray reflecting film so as to cover the infrared ray reflecting film. In this case, the infrared photosensitive area is held up from the first dielectric protective film by supports above the first dielectric protective film. In this configuration, infrared light that has been transmitted by the infrared photosensitive area is reflected toward the infrared photosensitive area by the infrared ray reflecting film on the substrate. The reflected infrared light is again irradiated upon the infrared ray absorbing part and shield and absorbed by these components. Thus, the formation of the infrared ray reflecting film on the surface of the substrate allows more infrared light to be absorbed by the infrared ray absorbing part and shield.

In the above-described configuration, at least a portion of the infrared ray absorbing part is arranged on the surface of the thermal detector that is directed away from the substrate, and the thermal infrared detector includes a metal thin-film that is formed on the surface of the infrared ray absorbing part that is directed away from the substrate and on the surface of the shield that is directed away from the substrate. This formation of a metal thin-film on the surfaces of the infrared ray absorbing part and shield realizes a construction in which infrared rays mutually interfere on the metal thin-film and heat the metal thin-film. As to the actual operation in a thermal infrared detector of this type of configuration, first, when infrared light is irradiated upon the metal thin-film on the infrared ray absorbing part and the shield, a portion of the incident infrared light is reflected by the metal thin-film. The rest of the infrared light that is incident to the metal thin-film passes through the metal thin-film and proceeds toward the substrate. The infrared light that has passed through the metal thin-film is then reflected toward the metal thin-film by the infrared ray reflecting film and contact pads on the substrate and again irradiated upon the metal thin-film. The infrared light that is again irradiated upon the metal thin-film causes destructive interference with the original infrared light that is to be reflected by the metal thin-film, and the infrared rays that cause interference are together absorbed by free electrons in the metal thin-film to become heat. The metal thin-film is consequently heated, its temperature rises, and the heat of the metal thin-film is transmitted by way of the shield and infrared ray absorbing part to the thermal detector. In this case, the detector is configured such that the heat of the shield and infrared ray absorbing part is rapidly conveyed to the thermal detector by the metal thin-film that is formed on the shield and infrared ray absorbing part.

The substrate preferably includes read-out circuits that: are electrically connected to the contact pads, convert the temperature change of the infrared ray absorbing part that is detected by the thermal detector to an electrical signal, and read out this electrical signal.

According to yet another aspect of the present invention, not only does the shield cover the supports of the infrared ray absorbing part and the contact pads of the substrate, but the shield further covers the surfaces of the electrodes of the infrared ray absorbing part that are directed away from the substrate with an interposed space. As with the above-described cases, this type of configuration enables an increase in the fill factor of each picture element of the thermal infrared detector and allows the absorption of more infrared light.

According to yet another aspect of the present invention, a shield such as is described hereinabove is provided in a configuration in which a metal thin-film, which is provided in an infrared photosensitive area such as described hereinabove, is heated by infrared rays that are caused to mutually interfere at the metal thin-film. The metal thin-film of the infrared ray absorbing part extends over the entire surface of the shield that is directed away from the substrate. When infrared light is irradiated upon the metal thin-film of the infrared photosensitive area in this thermal infrared detector, a portion of the irradiated infrared light is reflected by the metal thin-film. The remaining portion of the infrared light that is irradiated upon the metal thin-film passes through the metal thin-film and proceeds toward the substrate. The infrared light that has passed through the metal thin-film is reflected toward the metal thin-film by the infrared ray reflecting film and contact pads on the substrate and is again irradiated upon the metal thin-film. In this case, the infrared light that is again irradiated upon the metal thin-film causes destructive interference with the original infrared light that is to be reflected by the metal thin-film, and the infrared rays that produce this interference are absorbed by free electrons in the metal thin-film to become heat. The metal thin-film is therefore heated and its temperature rises, and the heat of the metal thin-film is conveyed to a thermal detector by way of the shield and dielectric film that contact the metal thin-film. In this thermal infrared detector that is configured such that infrared rays mutually interfere on a metal thin-film and heat the metal thin-film, the shield is caused to project from the dielectric film of the infrared photosensitive area, whereby this shield covers the electrodes of the infrared photosensitive area, the supports, and contact pads of the substrate. Extending the metal thin-film over the entire surface of the shield that is directed away from the substrate increases the fill factor of each picture element of the thermal infrared detector and enables greater absorption of infrared light, whereby the sensitivity of the thermal infrared detector can be increased.

The thermal detector of the infrared ray absorbing part is preferably any one of a thermistor-bolometer thin-film, a pyroelectric thin-film, or a thermopile.

Finally, the fabrication method of the thermal infrared detector of the present invention can produce a thermal infrared detector that has higher sensitivity and a higher fill factor and that can absorb more infrared light, as described hereinabove.

The above and other objects, features, and advantages of the present invention will become apparent from the following description with reference to the accompanying drawings which illustrate examples of the present invention.

BRIEF DESCRIPTION OF THE DRAWINGS

FIG. 11 is a plan view of the thermal infrared detector shown in FIG. 7 with the shield removed.

FIGS. 12A–12H are sectional views for explaining the method of fabricating the thermal infrared detector that is shown in FIGS. 7–11.

FIGS. 12J–12L are sectional views for explaining the method of fabricating the thermal infrared detector that is shown in FIGS. 7–11.

FIGS. 15A–15C are sectional views for explaining the method of fabricating the thermal infrared detector that is shown in FIGS. 13 and 14.

DETAILED DESCRIPTION OF THE PREFERRED EMBODIMENTS

First Working Example

Figure 1:
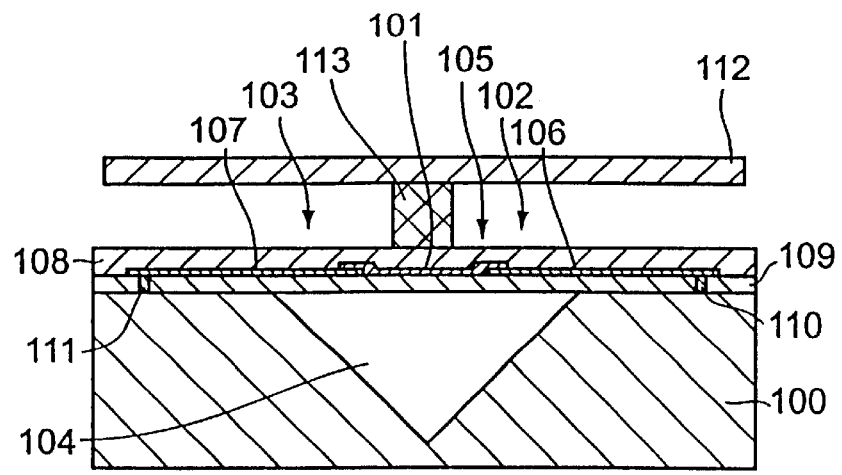
FIG. 1 is a sectional view showing a two-dimensional infrared solid-state imaging device as a prior-art thermal infrared detector having a thermal isolation structure.
Figure 2:
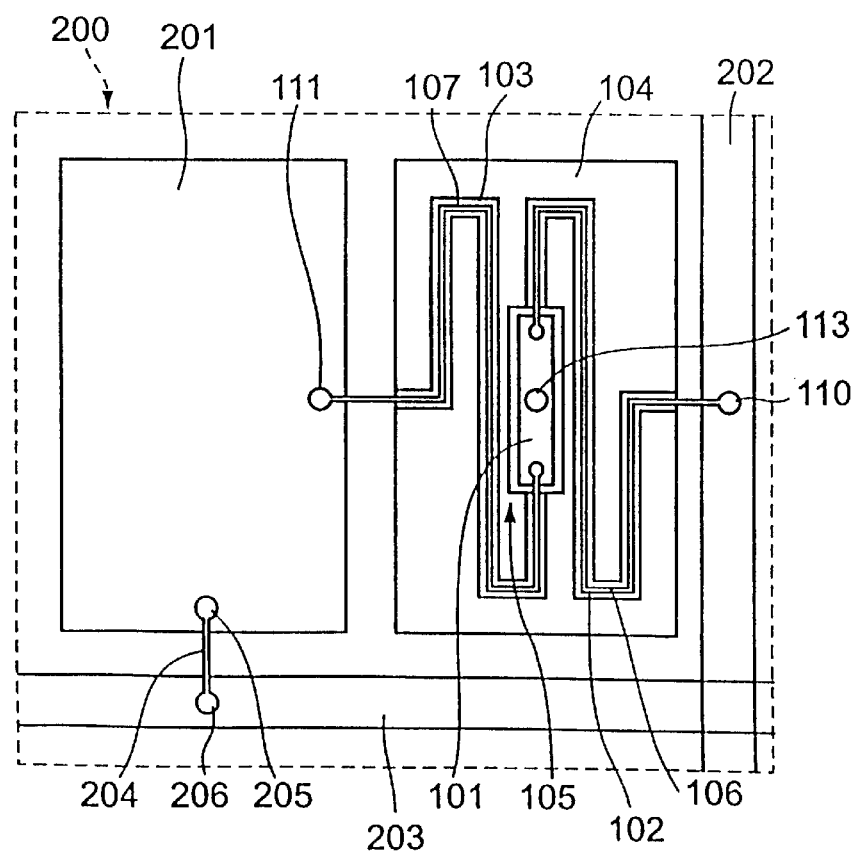
FIG. 2 is a plan view of a portion of one picture element of the two-dimensional infrared solid-state imaging device shown in FIG. 1 with the infrared ray absorbing part removed.
Figure 3:
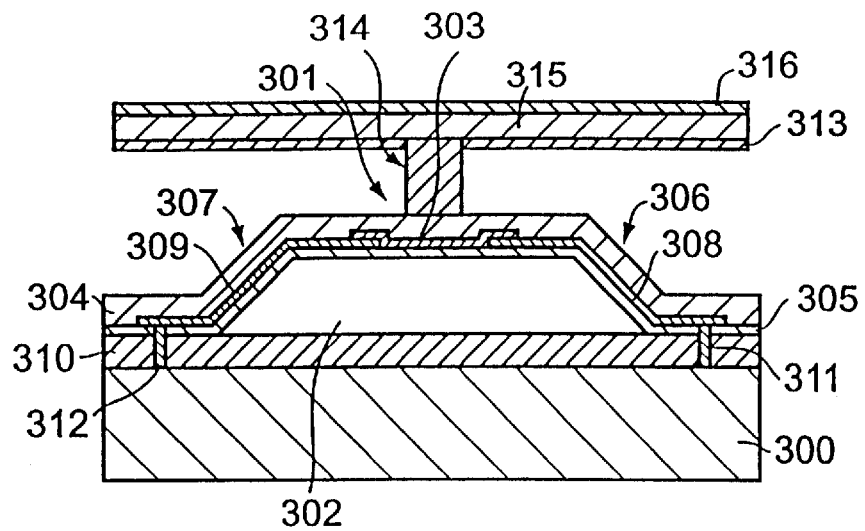
FIG. 3 is a sectional view showing another example of a two-dimensional infrared solid-state imaging device of the prior art that is different from the example shown in FIGS. 1 and 2.
Figure 4:
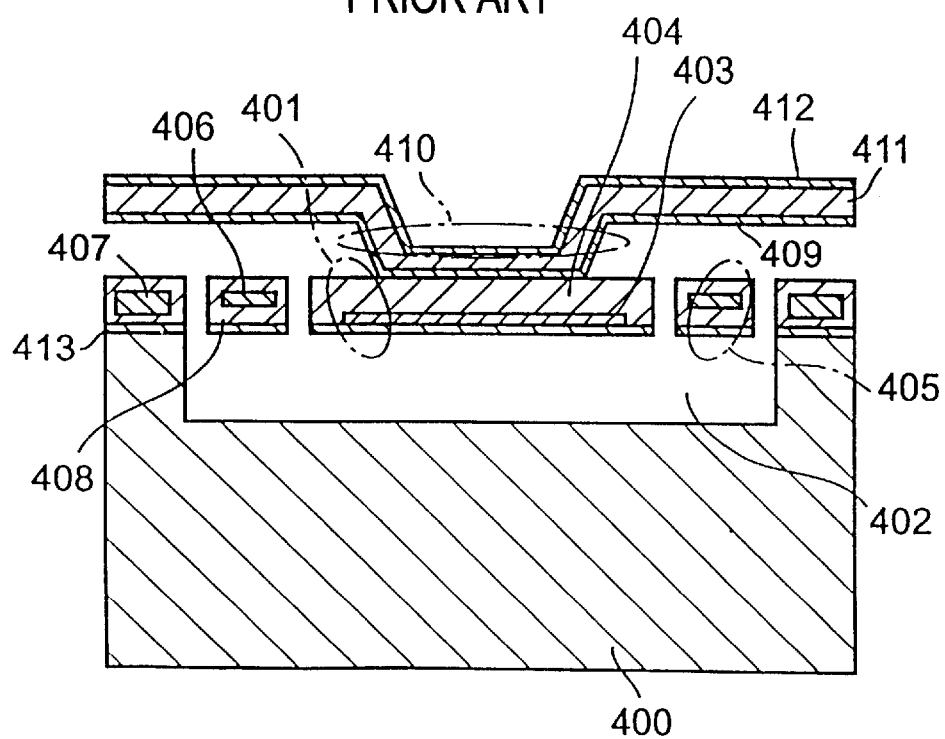
FIG. 4 is a sectional view showing a prior-art thermal infrared detector having a thermal isolation structure.
Figure 5:
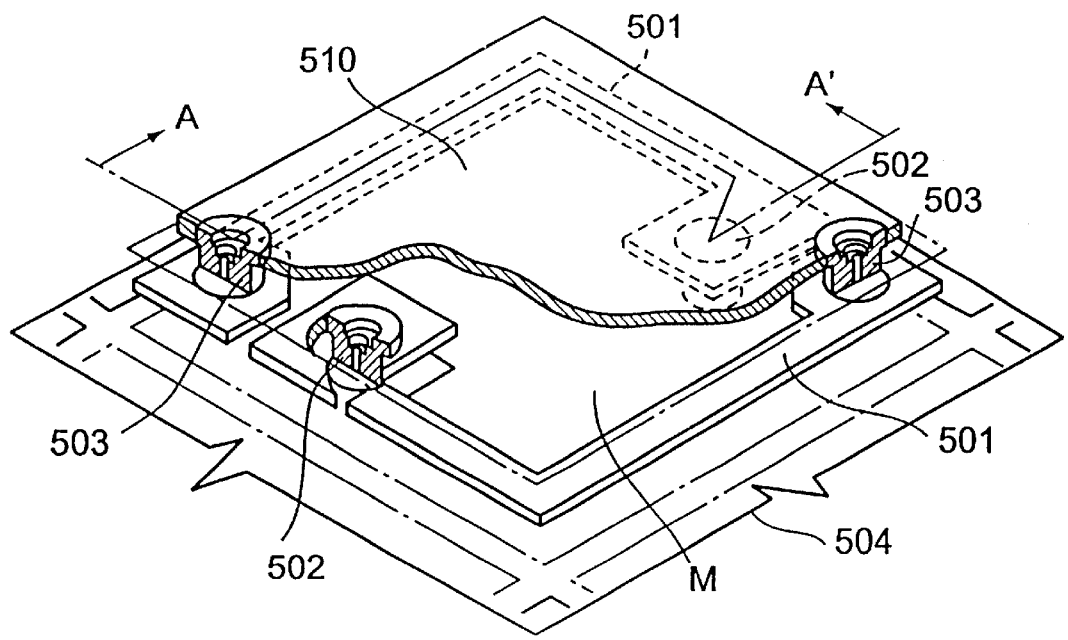
FIG. 5 is a perspective view showing a prior-art thermal infrared detector having a thermal isolation structure.
Figure 6:
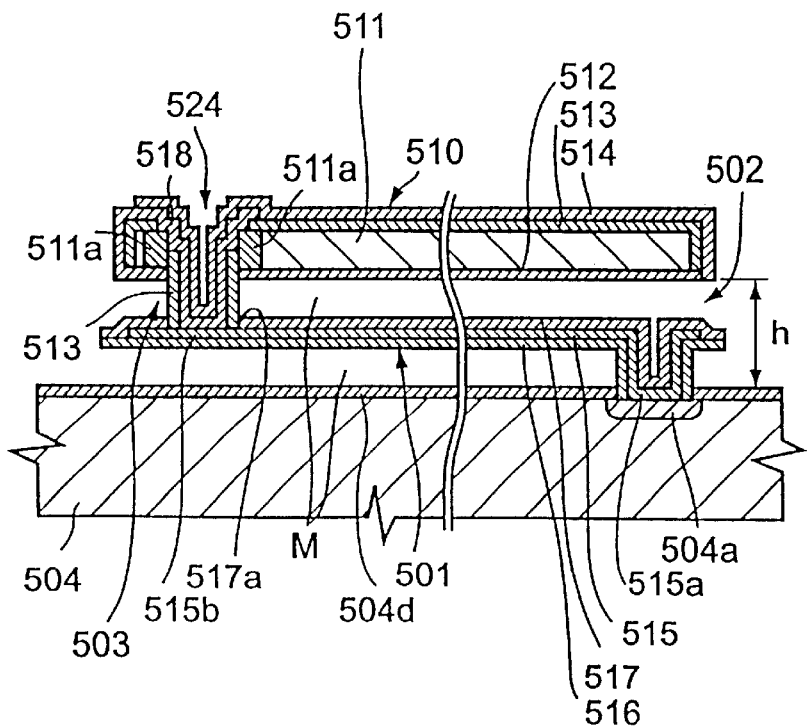
FIG. 6 is a sectional view at line A–A' of the thermal infrared detector that is shown in FIG. 5.
Figure 7:
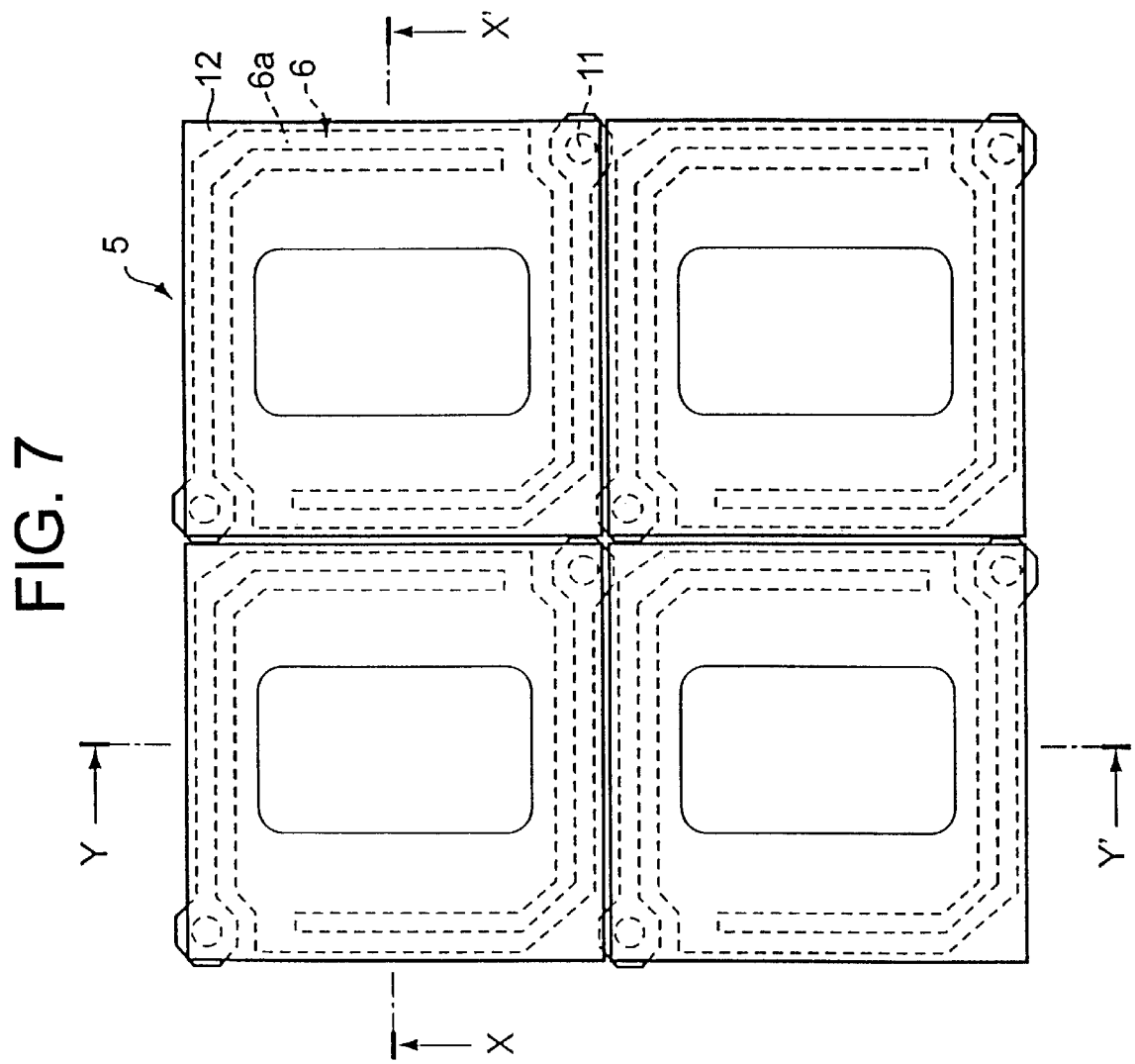
FIG. 7 is a plan view showing the thermal infrared detector according to the first embodiment of the present invention.

The thermal infrared detector according to the first working example of the present invention that is shown in FIGS. 7–11 is a two-dimensional array detector having a picture element pitch of 40 $\mu$m. FIGS. 7 and 11 each show four picture elements.

Figure 8:
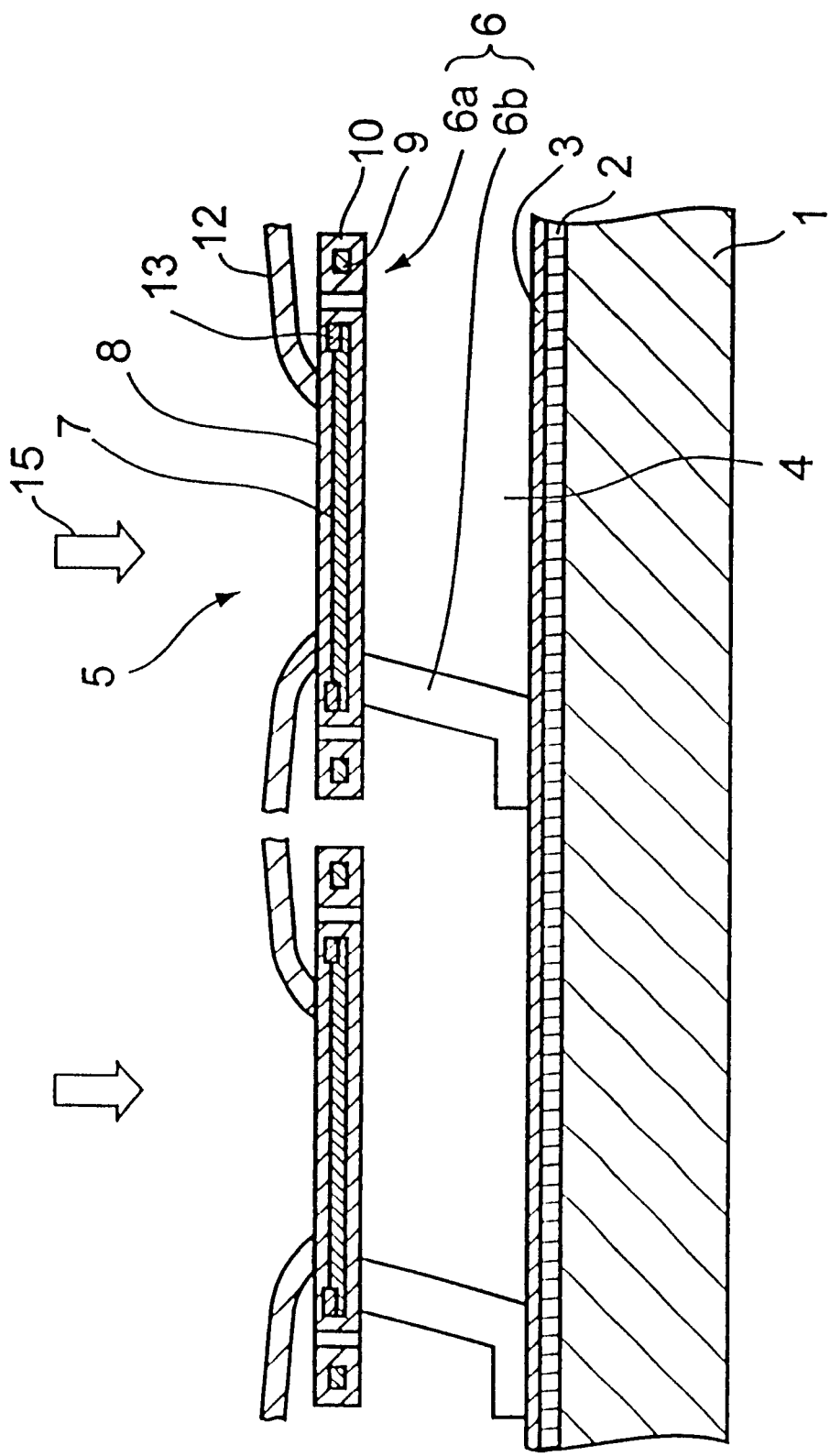
FIG. 8 is a sectional view at line X–X' of FIG. 7.
Figure 9:
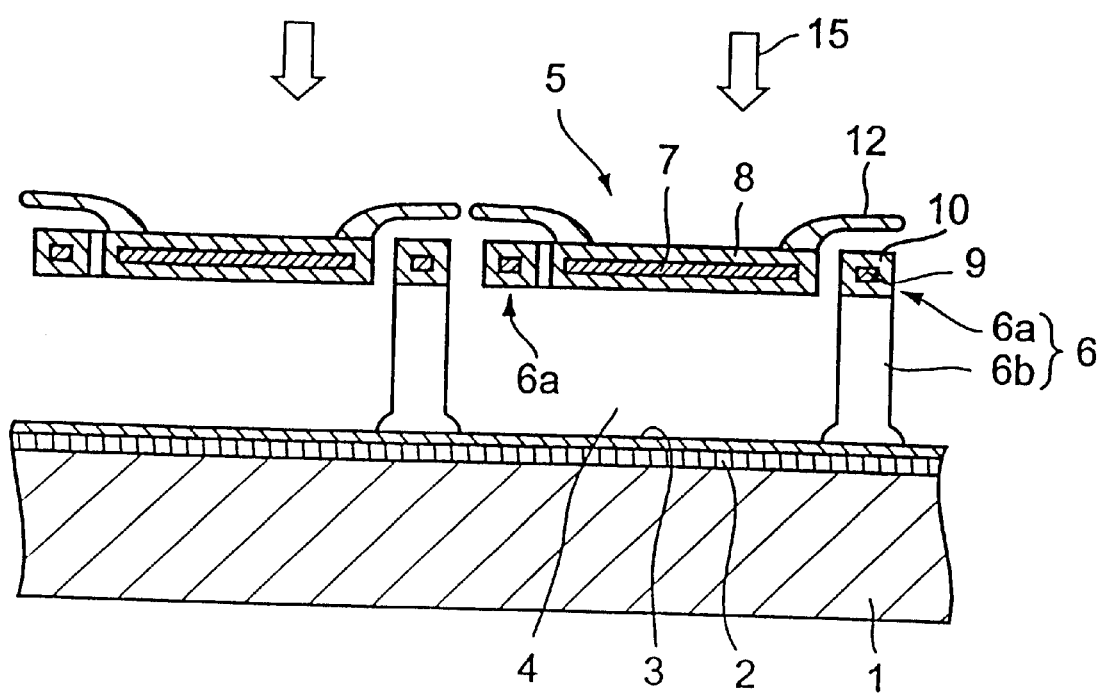
FIG. 9 is a sectional view at line Y–Y' of FIG. 7.

As shown in FIGS. 8 and 9, infrared ray reflecting film 2 composed of titanium and having a film thickness of 200 nm is formed on the surface of silicon substrate 1. Dielectric protective film 3 composed of silicon oxide and having a thickness of 200 nm is formed on the surface of infrared ray reflecting film 2, infrared ray reflecting film 2 being thus covered by dielectric protective film 3. Although titanium is used as the metal material that constitutes infrared ray reflecting film 2 in this embodiment, another material that realizes substantially 100% reflection of infrared light in the 8–12 $\mu$m wavelength region may be used as this metal material in place of titanium, including, for example, aluminum (Al), tungsten (W), tungsten silicide (WSi), and titanium nitride (TiN). In addition, although dielectric protective film 3 is a silicon oxide film in this embodiment, dielectric protective film 3 may also be a silicon nitride film or a silicon oxynitride film.

In the thermal infrared detector of this embodiment, a plurality of infrared photosensitive areas 5 are arranged above the surface of first dielectric protective film 3 that is on silicon substrate 1, as shown in each of FIGS. 7–11. Each of infrared photosensitive areas 5 is supported by two supports 6 above, and separated by cavity 4 from, the surface of first dielectric protective film 3, one infrared photosensitive area 5 being arranged in each picture element. As shown in FIGS. 7 and 11, each of supports 6 extends along the outer perimeter of infrared photosensitive area 5 as seen from above the surface of infrared photosensitive area 5. In addition, to decrease thermal conductance between infrared photosensitive area 5 and silicon substrate 1, each of supports 6 extends over the distance of two contiguous edges of infrared photosensitive area 5. Each of these supports 6 is made up by beam 6a that is parallel to the surface of silicon substrate 1 and support leg 6b that is connected to one end of beam 6a.

Infrared photosensitive area 5 is made up by: thermistor-bolometer thin-film 7, which is a thermal detector; two electrodes 13 that contact thermistor-bolometer thin-film 7; and dielectric protective film 8, which is an infrared ray absorbing part that surrounds thermistor-bolometer thin-film 7 and two electrodes 13. The outside shape of thermistor-bolometer thin-film 7 and infrared ray absorbing part 5 is substantially rectangular, and electrodes 13 each extend in a direction that is parallel to one edge of thermistor-bolometer thin-film 7. One of two electrodes 13 that are provided in each infrared photosensitive area 5 contacts one end of thermistor-bolometer thin-film 7 and is electrically connected to that thin-film. The other electrode 13 contacts the other end of thermistor-bolometer thin-film 7 and is electrically connected to that thin-film.

One end of support leg 6b of plate form that constitutes support 6 is secured to contact pads 11 of silicon substrate 1. Support leg 6b extends at an angle with respect to the surface of silicon substrate 1 from one end of silicon substrate 1 in a direction away from silicon substrate 1. The other end of this support leg 6b that is opposite silicon substrate 1 connects to one end of beam 6a, which is parallel to the surface of silicon substrate 1. Beam 6a bends 90° in the vicinity of the corner of infrared photosensitive area 5, and the other end of beam 6a is connected to the side surface of infrared photosensitive area 5.

Each of beam 6a and support leg 6b of support 6 is composed by covering metal wiring 9 with second dielectric protective film 10. One end of metal wiring 9 on the silicon substrate 1 side is electrically connected to contact pads 11, and the other end of metal wiring 9 on the infrared photosensitive area 5 side is electrically connected to one end of electrode 13. Electrodes 13 and contact pads 11 are therefore electrically connected via metal wiring 9 in support 6. Two contact pads 11 are arranged in each of the picture elements, and each of contact pads 11 is electrically connected to read-out circuit 16 that is formed in silicon substrate 1 as shown in FIG. 10.

A polyimide film is packed as a sacrificial layer into cavity 4 in a fabrication step to be described hereinbelow, but as the final stage of the fabrication process, this polyimide film is removed by, for example, ashing by an oxygen plasma. The thermal isolation structure in which infrared photosensitive area 5 is held above silicon substrate 1 by supports 6 as described hereinabove impedes the escape of heat that accumulates in infrared photosensitive area 5 to silicon substrate 1, which is a heat sink.

Shield 12 projects from the surface of infrared photosensitive area 5 that is directed away from silicon substrate 1, i.e., projects from the upper surface of dielectric protective film 8 upon which infrared light is irradiated. Shield 12 extends so as to cover electrodes 13, supports 6, and contact pads 11, space being interposed between itself and electrodes 13 in infrared photosensitive area 5, supports 6, and contact pads 11. In other words, the surfaces of electrodes 13 that are directed away from silicon substrate 1, the surface of metal wiring 9 that is directed away from silicon substrate 1, and the surfaces of contact pads 11 are each covered by shield 12 with an interposed space. Shield 12 is a silicon nitride film, and is the infrared ray absorbing part that absorbs infrared light and converts this infrared light to heat. In addition to a silicon nitride film, this shield 12 may be a silicon oxide film, a silicon oxynitride film, a silicon carbide film, or a laminated film in which at least two of these films are combined.

Figure 10:
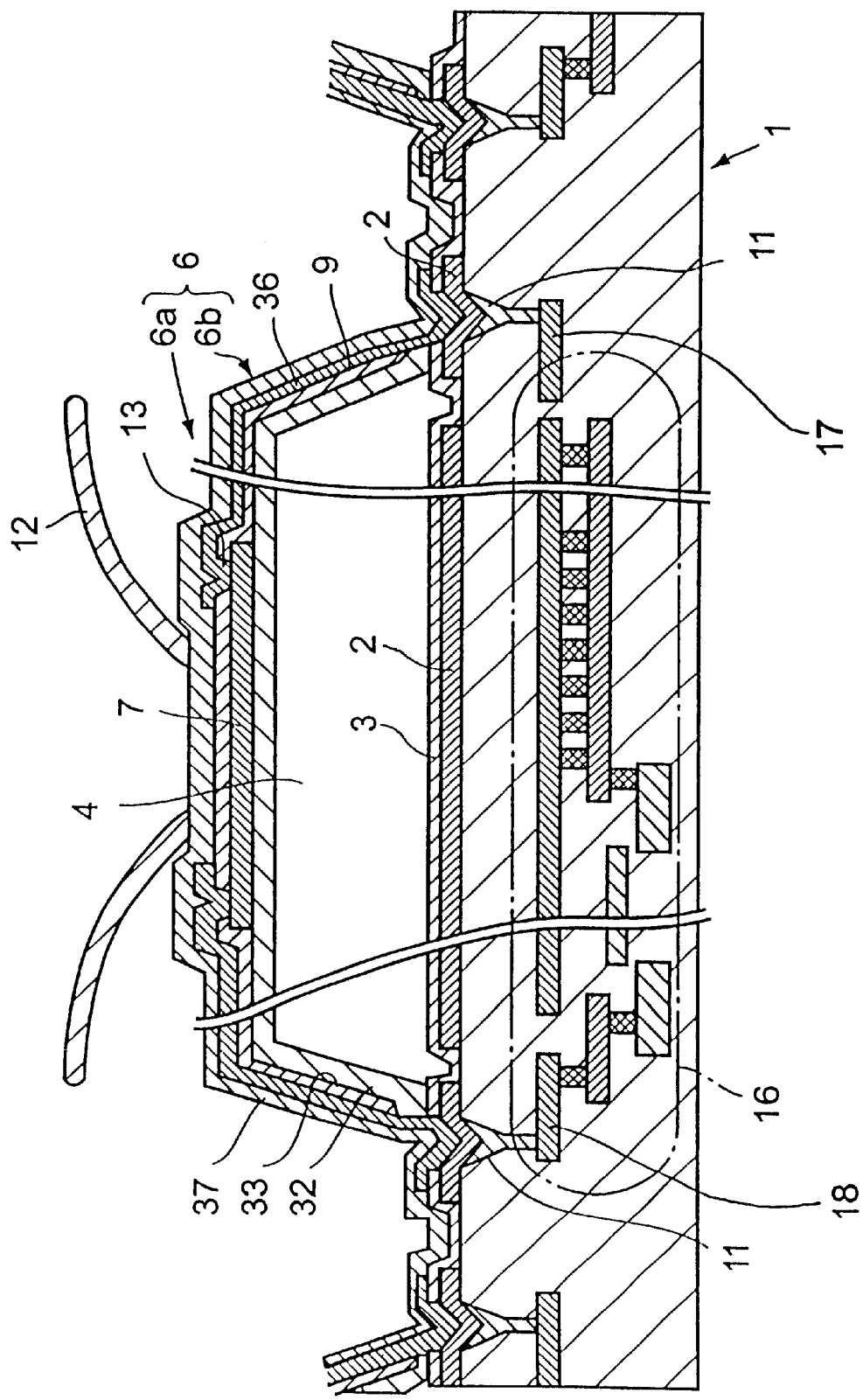
FIG. 10 is a sectional view along the current path in the thermal infrared detector that is shown in FIGS. 7–9.

Accordingly, as seen from above the surface of infrared photosensitive area 5, the portion of shield 12 that connects to dielectric protective film 8, i.e., the base of shield 12, is arranged more toward the inside of infrared photosensitive area 5 than electrodes 13 in areas that are close to electrodes 13, as shown in FIGS. 8 and 10. In other areas, i.e., in areas that are not close to electrodes 13, the base of shield 12 is arranged at the edges of infrared photosensitive area 5 as seen from above the surface of infrared photosensitive area 5, as shown in FIGS. 9 and 11. The distance between electrodes 13 and portions of shield 12 that are close to electrodes 13 is preferably set to a value that is equal to or greater than the thickness of dielectric protective film 8 over thermistor-bolometer thin-film 7.

Vanadium oxide is used as the material of thermistor-bolometer thin-film 7, and the thickness of thermistor-bolometer thin-film 7 is approximately 100 nm. Electrodes 13 are composed of titanium having a thickness of approximately 100 nm, and dielectric protective film 8 is composed of silicon nitride film 8 having a thickness of approximately 500 nm. Any material having a high temperature coefficient of electric resistance may be used as thermistor-bolometer thin-film 7, and materials that may be used include an amorphous germanium or amorphous silicon doped with impurities or titanium or vanadium oxide with added impurities.

Metal wiring 9 inside beam 6a and support leg 6b is composed of titanium, the cross-sectional shape of this metal wiring 9 being a rectangle 100 nm thick and 1 $\mu$m wide. Second dielectric protective film 10 that encloses metal wiring 9 is composed of a silicon nitride film, and the cross-sectional shape of beam 6a and support leg 6b is a rectangle 500 nm thick and 2.6 $\mu$m wide. The total length of one beam 6a and one support leg 6b is approximately 86 $\mu$m. In lieu of a silicon nitride film, dielectric protective film 8 and second dielectric protective film 10 may be a silicon oxide film, a silicon oxynitride film, a silicon carbide film, or a laminated film in which at least two of these films are combined. The material of dielectric protective film 8 and shield 12 must effectively absorb infrared light.

Dielectric protective film 8 that covers thermistor-bolometer thin-film 7 and second dielectric protective film 10 of supports 6 are constituted by dielectric protective films 32, 33, and 37 shown in FIG. 10 and formed by a fabrication process that is explained hereinbelow. In the interest of simplifying the fabrication steps of the thermal infrared detector, dielectric protective film 8 and second dielectric protective film 10 are in this way constituted by the same dielectric protective films and the same material may be used as dielectric protective film 8 and second dielectric protective film 10. Dielectric protective film 8 is constituted by a portion of dielectric protective films 32, 33, and 37 at the perimeter of thermistor-bolometer thin-film 7. Second dielectric protective film 10 is constituted by another portion of dielectric protective films 32, 33, and 37. Electrodes 13 of infrared photosensitive area 5 and metal wiring 9 inside supports 6 are constituted by metal film 36 shown in FIG. 10 and are formed by the same wiring material. The portions in this metal wiring 36 that connect to thermistor-bolometer thin-film 7 are electrodes 13.

The size of contact pads 11 is approximately 7.5 µm square, and almost all of the area of contact pads 11 (approximately 6 µm square) is covered by a titanium film having a thickness of 100 nm and an aluminum film having a thickness of 200 nm. Covering contact pads 11 with a titanium film and aluminum film in this way both increases the reflectance of infrared light over contact pads 11 and electrically connects the titanium film and aluminum film on contact pads 11 to read-out circuit 16 inside silicon substrate 1. As shown in FIGS. 10 and 11, a plurality of each of signal lines 17 and wires 18 to the picture element that extend in mutually parallel directions are formed inside silicon substrate 1. A plurality of contact pads 11 are arranged over each of signal lines 17 and wires 18 to the picture elements, and contact pads 11 over signal lines 17 are electrically connected to signal lines 17, and contact pads 11 over picture element wires 18 are electrically connected to picture element wires 18.

In lieu of laminated films of titanium (Ti) and aluminum (Al), the metal films that cover contact pads 11 may be aluminum (Al), tungsten (W), tungsten silicide (WSi), or titanium nitride (TiN) films or a laminated construction of these films that contains a titanium film. In the case of this embodiment in which a titanium film and aluminum film are laminated above contact pads 11, the thermal conductance is $8.2 \times 10^{-8}$ W/K, the fill factor of infrared photosensitive area 5 is 47%, and the thermal capacity of infrared photosensitive area 5 is $9 \times 10^{-10}$ J/K. The thermal time constant in such a case is 11 msec, and this value is sufficiently less than the 33 msec that corresponds to a television frame rate and eliminates problems when converting to real-time imaging.

In a configuration in which infrared photosensitive area 5 is supported by supports 6 in this way, the fill factor can be increased by projecting shield 12, which absorbs infrared light, from the outer perimeter of infrared photosensitive area 5 in areas where electrodes 13 are not present, and from areas that are approximately 0.5–1 µm inward from electrodes 13 in areas where electrodes 13 are present. In this embodiment, the base of shield 12 is arranged at the edge of infrared photosensitive area 5 in areas where electrodes 13 are not present, and the base of shield 12 is arranged at a position 0.5 µm farther inward from electrodes 13 in areas where electrodes 13 are present. The fill factor in which infrared photosensitive area 5 and shield 12 are combined therefore reaches 90%, and the sensitivity of the detector is 1.9 times higher than a case in which only infrared photosensitive area 5 is used. Although the position of the base of shield 12 is set to a position 0.5 µm inside in areas where electrodes 13 are present in this embodiment, the distance need not be 0.5 µm and may alternatively be set to approximately the thickness of dielectric protective film 8 that is formed on thermistor-bolometer thin-film 7. Any material that absorbs infrared light of the 10 µm wavelength region may be used as shield 12, and materials that may be used include an amorphous silicon carbide film, a silicon oxide film, or a silicon oxynitride film, or alternatively, a laminated film in which at least any two of these films are combined.

Next, regarding the operating principles of the thermal infrared detector of this embodiment, when infrared light 15 is irradiated upon dielectric protective film 8 and shield 12 of infrared photosensitive area 5, a portion of incident infrared light 15 is absorbed by each of dielectric protective film 8 and shield 12, and dielectric protective film 8 and shield 12 are thus heated. The remaining portion of infrared light 15 that is irradiated upon dielectric protective film 8 and shield 12 is transmitted by each of infrared photosensitive area 5, shield 12, and supports 6 and proceeds toward silicon substrate 1. Infrared light 15 that has been transmitted by each of infrared photosensitive area 5, shield 12, and supports 6 is reflected by infrared ray reflecting film 2, metal wiring 9, and contact pads 11 toward infrared photosensitive area 5 and shield 12, and is again irradiated upon dielectric protective film 8 and shield 12. Infrared light that has been reflected by infrared ray reflecting film 2 is thus absorbed by dielectric protective film 8 and shield 12, and dielectric protective film 8 and shield 12 are thus further heated.

The heat of shield 12 is conveyed through dielectric protective film 8 to thermistor-bolometer thin-film 7. In this way, the temperature of thermistor-bolometer thin-film 7 is changed by heat from shield 12 and dielectric protective film 8, whereby the resistance of thermistor-bolometer thin-film 7 changes. This change in resistance is converted to a voltage change and read out as an electrical signal by signal read-out circuit 16 inside silicon substrate 1 and then converted to an infrared image by an outside circuit based on this electrical signal. In this case, infrared ray reflecting film 2, metal wiring 9 inside beam 6a, and contact pads 11 are preferably flat in order to again irradiate the infrared light that has been transmitted by shield 12 or infrared photosensitive area 5 onto shield 12 and infrared photosensitive area 5.

In the thermal infrared detector of the above-described present embodiment, shield 12 projects out from dielectric protective film 8 of infrared photosensitive area 5 such that this shield 12 covers, with interposed spaces, contact pads 11 and the surfaces of each of electrodes 13 and supports 6 that are directed away from silicon substrate 1. As a result, the fill factor of each picture element can be increased and more infrared light can absorbed with virtually no increase in thermal time constant, thereby enabling an increase in the sensitivity of the thermal infrared detector. In addition, arranging the base of the shield in the vicinity of the edges of the infrared photosensitive area also enables an adequate decrease of the thermal time constant from the time interval of 33 msec that corresponds to the frame rate of television with virtually no increase in thermal capacity.

The thermal infrared detector of the above-described embodiment is a thermistor-bolometer device, but this method of increasing the fill factor by projecting shield 12 out from infrared photosensitive area 5 is also effective in a ferroelectric (pyroelectric) or thermopile thermal infrared detector. In other words, a pyroelectric thin-film or a thermopile may be used in place of thermistor-bolometer thin-film 7 as the thermal detector of infrared photosensitive area 5.

Next, regarding the method of fabricating the above-described thermal infrared detector, we now refer to FIGS. 12A–12L. FIGS. 12A–12H and FIGS. 12J–12L each show sectional views along the current path of the thermal infrared detector, similar to FIG. 10.

First, in FIG. 12A, silicon substrate 1 is prepared. This silicon substrate 1 is provided with a plurality of read-out circuits 16 and contact pads 11. Read-out circuits 16 are formed inside silicon substrate 1; and the surfaces of contact pads 11, which are electrically connected to read-out circuits 16, are exposed on the surface of silicon substrate 1.

Next, in FIG. 12B, infrared ray reflecting film 2 is formed on the portion of the surface of silicon substrate 1 that corresponds to infrared photosensitive area 5 and on the surfaces of contact pads 11 and their peripheries.

Then, in FIG. 12C, first dielectric protective film 3 is formed on the surface of silicon substrate 1 and over the entire surface of each of infrared ray reflecting film 2 so as to cover each of infrared ray reflecting film 2 on silicon substrate 1.

Next, in FIG. 12D, first sacrificial layer 31 for forming a space and cavity 4 between supports 6 and silicon substrate 1 is formed on the portion and its periphery that correspond to infrared photosensitive area 5 on the surface of first dielectric protective film 3. First sacrificial layer 31 is formed as a plurality of islands on silicon substrate 1, and the surfaces of the portions of first sacrificial layer 31 that correspond to support legs 6b incline with respect to the surface of silicon substrate 1 as shown in FIG. 12D. First sacrificial layer 31 is composed of polyimide and is removed in the final stage of the fabrication process. When forming first sacrificial layer 31, photosensitive polyimide is first applied over the entire surface of first dielectric protective film 3. The photosensitive polyimide on first dielectric protective film 3 is then patterned by means of an exposure and development process and a heat treatment to form island shapes, thereby forming first sacrificial layer 31 composed of photosensitive polyimide.

Next, dielectric protective film 32 is formed as a first material film by a plasma CVD method over the entire surfaces of each of first sacrificial layer 31 and first dielectric protective film 3, whereby first sacrificial layer 31 is covered by dielectric protective film 32. A silicon nitride film, a silicon oxide film, or a silicon oxynitride film is formed as dielectric protective film 32.

Figure 12E:
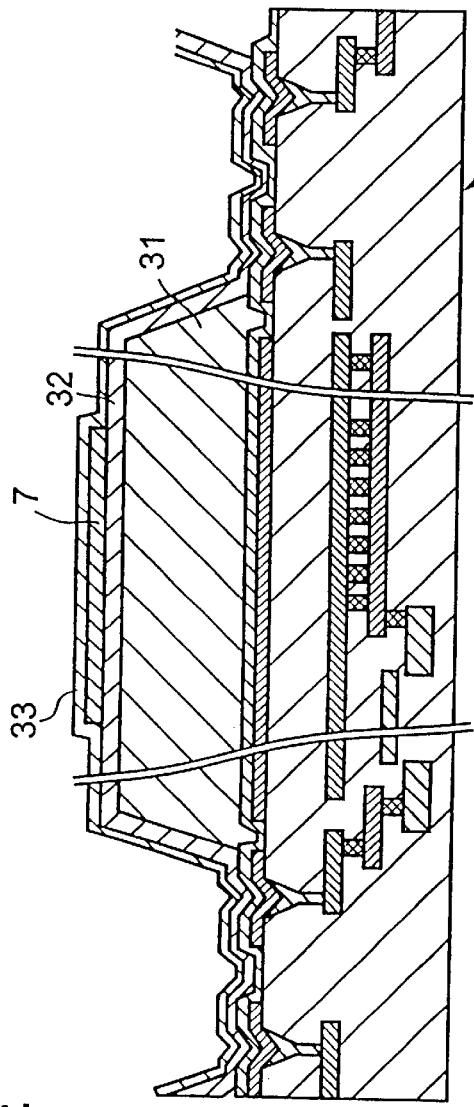

In FIG. 12E, thermistor-bolometer thin-film 7 is next formed on the surface of the portion of dielectric protective film 32 that corresponds to infrared photosensitive area 5 on the portion above first sacrificial layer 31. When forming thermistor-bolometer thin-film 7, a film of vanadium oxide, which is a thermistor-bolometer material, is first formed as a thermoelectric material thin-film by a reactive sputtering method over the entire surface of dielectric protective film 32. Following an exposure and development process, the film of vanadium oxide on dielectric protective film 32 is then treated by an etching process by means of a plasma of mixed gas of $SF_6$ and $CO_2$ as disclosed in Japanese Patent Laid-open Publication No. 330051/99. Thermistor-bolometer thin-film 7 composed of vanadium oxide is formed by patterning the vanadium oxide film using this type of exposure and development process and etching process.

Dielectric protective film 33 is next formed as a second material film by a plasma CVD method over the entire surfaces of both thermistor-bolometer thin-film 7 and dielectric protective film 32 such that thermistor-bolometer thin-film 7 is covered. A silicon nitride film, a silicon oxide film, or a silicon oxynitride film is formed as dielectric protective film 33.

Figure 12F:
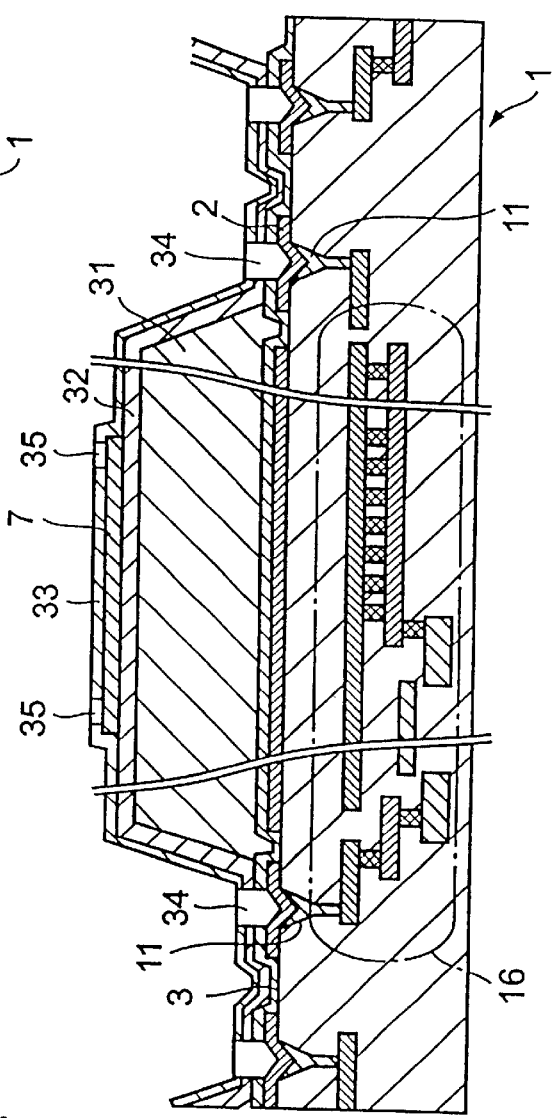
Figure 12G:
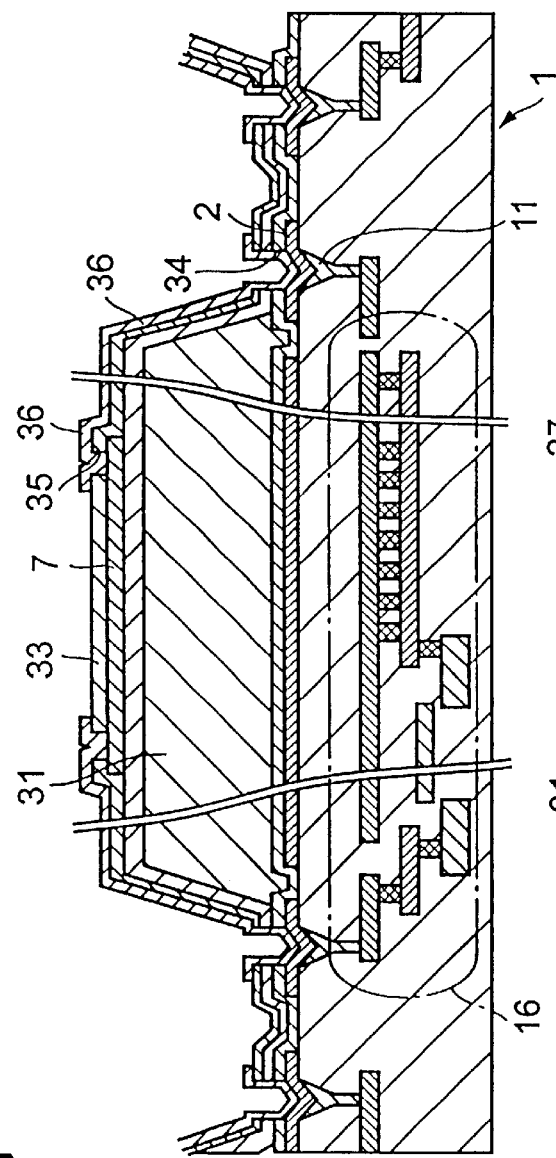

In FIG. 12F, first openings 34 that are to serve as contact holes are next formed at portions of first dielectric protective film 3 and dielectric protective films 32 and 33 that correspond to contact pads 11 in order to obtain electrical contact with read-out circuit 16 inside silicon substrate 1. The surface of infrared ray reflecting film 2 over contact pads 11 is thus exposed at the bottom of first openings 34.

Next, in order to obtain electrical contact with thermistor-bolometer thin-film 7, second openings 35 that are to serve as contact holes are formed at portions of dielectric protective film 33 that correspond to the ends of thermistor-bolometer thin-film 7, i.e., the portions that correspond to electrodes 13 shown in, for example, FIG. 11. The shape of second openings 35 corresponds to the shape of electrodes 13 and each thus takes the form of a slit that extends along an edge of thermistor-bolometer thin-film 7. A portion of the surfaces of thermistor-bolometer thin-film 7 is thus exposed at the bottom of each of second openings 35.

In the step of forming first openings 34, after exposure and development processing, portions of first dielectric protective film 3 and dielectric protective films 32 and 33 that correspond to contact pads 11 are etched by a plasma of a gas mixture of $CF_4$ and $O_2$ or a gas mixture of $CHF_3$ and $O_2$. In the step of forming second openings 35, after the exposure and development process, portions of dielectric protective film 33 that correspond to the ends of thermistor-bolometer thin-film 7 are etched by a plasma of a gas mixture of $CF_4$ and $O_2$ or a gas mixture of $CHF_3$ and $O_2$ In FIG. 12G, in order to electrically connect readout circuit 16 in silicon substrate 1 and thermistor, bolometer thin-film 7, metal film 36 composed of, for example, titanium or nichrom is formed by a sputtering method over the entire surface of dielectric protective film 33 and the entire inner walls of first openings 34 that include the exposed surface of infrared ray reflecting film 2, and the entire surface of the inner walls of second openings 35 that include the exposed surface of thermistor-bolometer thin-film 7. In a case in which metal film 36 is composed of titanium, after an exposure and development process, metal film 36 is next etched by a plasma of a gas mixture of $Cl_2$ and $BCl_3$ to pattern metal film 36. Metal film 36 is thus processed into the form of electrical wiring that electrically connects thermistor-bolometer thin-film 7 and contact pads 11.

Electrodes 13 are constituted by the portions of metal film 36 that contact thermistor-bolometer thin-film 7. Further, Metal wiring 9 inside supports 6 is constituted by one part of the portion of metal film 36 that is formed on first sacrificial layer 31. The portions of metal film 36 that are inside first openings 34 are electrically connected to contact pads 11 by way of infrared ray reflecting film 2 that is on contact pads 11.

Figure 12H:
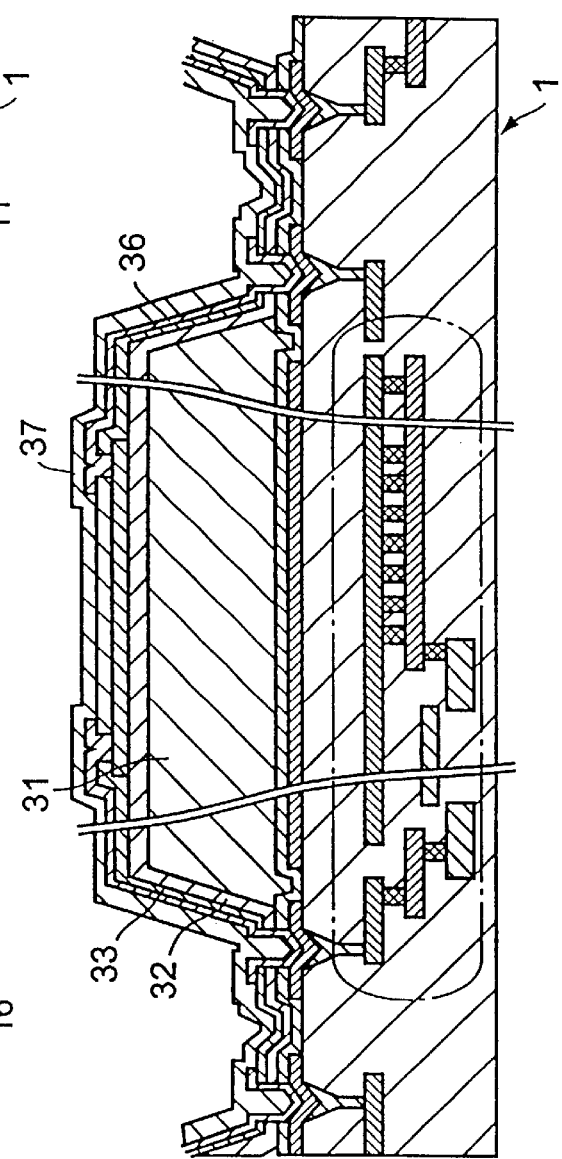

Next, in FIG. 12H, dielectric protective film 37 is formed as the third material film by a plasma CVD method over the entire surface of metal film 36 and dielectric protective film 33 so as to cover metal film 36. A silicon nitride film, a silicon oxide film, or a silicon oxynitride film is formed as dielectric protective film 37.

Figure 12I:
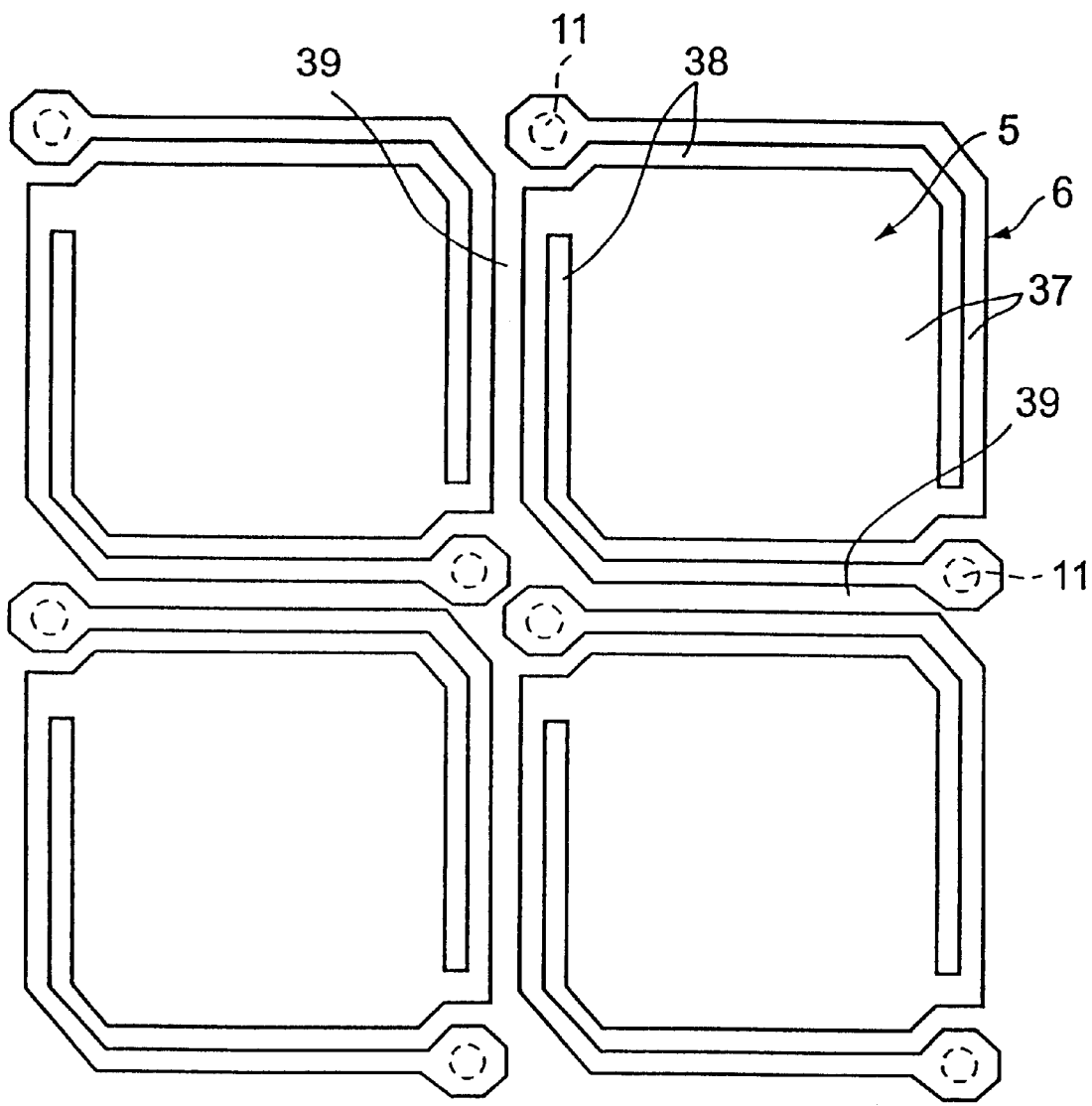
FIG. 12I is a plan view for explaining the method of fabricating the thermal infrared detector that is shown in FIGS. 7–11.

In FIG. 12I, in order to form a thermal isolation structure in which infrared photosensitive area 5 is held up above silicon substrate 1 by supports 6, dielectric protective films 32, 33, and 37 that are shown in FIG. 12H are patterned to form slits 38 and 39 in these dielectric protective films. Slits 38 are gaps between infrared photosensitive area 5 and supports 6 in one picture element, and slit 39 is a gap between two adjacent supports. First sacrificial layer 31 is exposed at the bottom of slits 38.

When forming each of slits 38 and 39, following an exposure and development process, dielectric protective films 32, 33, and 37 are etched to slit shapes by a plasma of a gas mixture of $CF_4$ and $O_2$ or a gas mixture of $CHF_3$ and $O_2$, thereby exposing the polyimide of first sacrificial layer 31 at the bottom of each of slits 38 and 39. Dielectric protective film 8 that covers thermistor-bolometer thin-film 7 is constituted by the portions of dielectric protective films 32, 33, and 37 that are around the periphery of thermistor-bolometer thin-film 7. In addition, second dielectric protective film 10 of supports 6 is constituted from the other portions of each of dielectric protective films 32, 33, and 37.

Figure 12J:
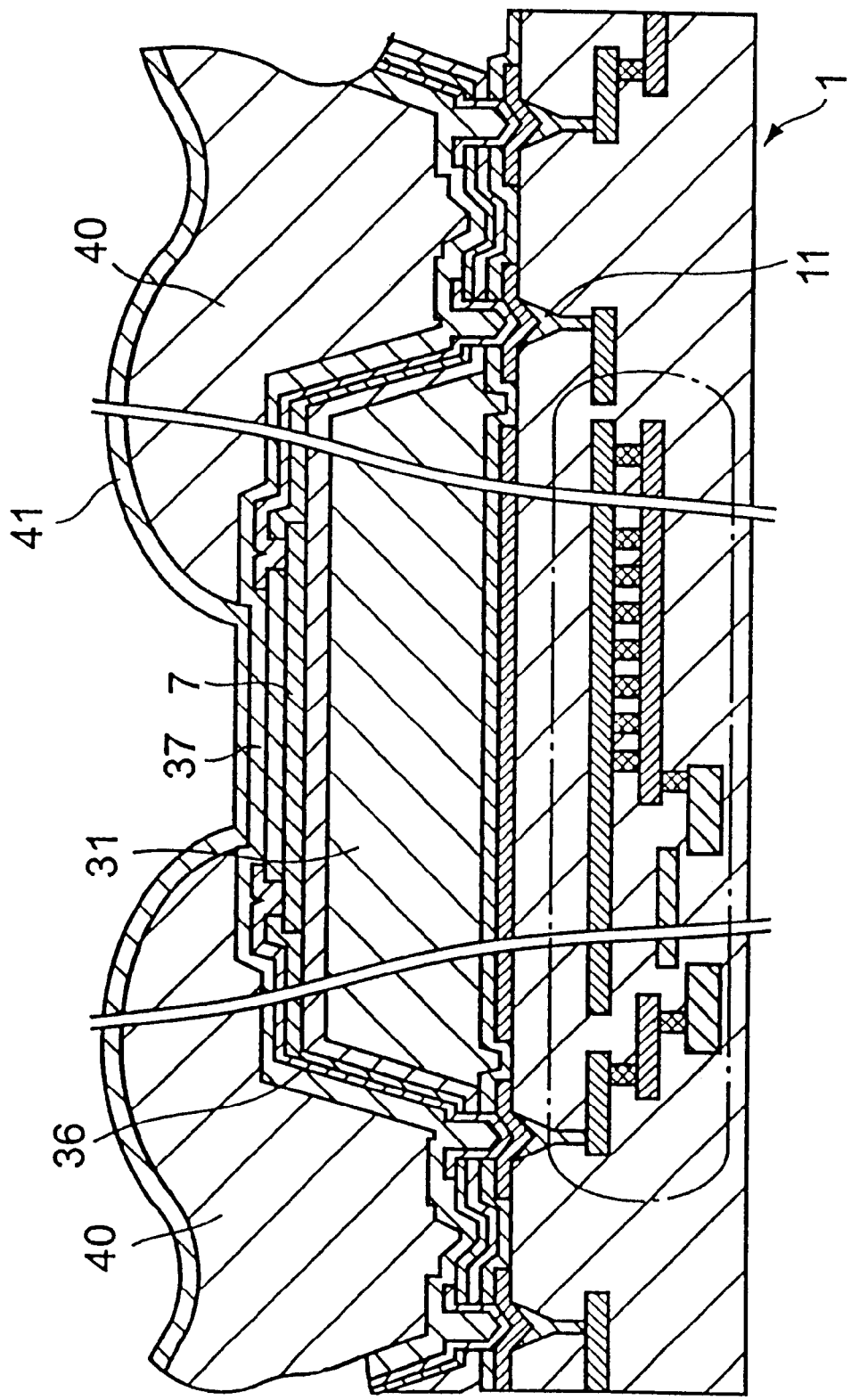

In FIG. 12J, in order to form second sacrificial layer for forming the shape of shield 12, photosensitive polyimide is applied to the entire surface of dielectric protective film 37, and in addition, introduced into slits 38 and 39 shown in FIG. 12I. This photosensitive polyimide is then patterned by an exposure and development process and a heat treatment to form island shapes, thereby forming second sacrificial layer 40 composed of photosensitive polyimide on the surface of dielectric protective film 37. Second sacrificial layer 40 is provided for forming the space between electrodes 13 of infrared photosensitive area 5 and shield 12, the space between supports 6 and shield 12, and the space between contact pads 11 and shield 12. The shape of the surface of second sacrificial layer 40 is curved in accordance with the shape of shield 12.

This second sacrificial layer 40 covers all portions other than the central portion of thermistor-bolometer thin-film 7. Immediately after forming second sacrificial layer 40 by patterning, the surface of the portion of dielectric protective film 37 that corresponds to the central portion of thermistor-bolometer thin-film 7 is exposed. The entire surfaces of metal film 36 and contact pads 11 that are directed away from silicon substrate 1 are therefore covered by second sacrificial layer 40.

By filling slits 38 and 39 with photosensitive polyimide and forming second sacrificial layer 40 inside slits 38 and 39 as described hereinabove, second sacrificial layer 40 is also formed on the surface of first sacrificial layer 31 that is exposed at the bottom of slit 38. Accordingly, first sacrificial layer 31 contacts second sacrificial layer 40 at the bottom of slit 38.

Next, dielectric protective film 41 is formed as a fourth material film by a plasma CVD method over the entire surface of second sacrificial layer 40 and the over the entire exposed surface of dielectric protective film 37. A silicon nitride film, a silicon oxide film, or a silicon oxynitride film is formed as dielectric protective film 41.

In FIG. 12K, in order to form shield 12 that absorbs infrared light, an exposure and development process is carried out, following which dielectric protective film 41 is etched into slit forms by a plasma of a gas mixture of $CF_4$ and $O_2$ or a gas mixture of $CHF_3$ and $O_2$ to partially expose second sacrificial layer 40. Shield 12 is thus formed from dielectric protective film 41 that remains on second sacrificial layer 40 and projects out from dielectric protective film 37. In FIG. 12K, the portion of dielectric protective film 41 that is formed directly on the surface of dielectric protective film 37 is removed, but this portion of dielectric protective film 41, i.e., the portion that contacts dielectric protective film 37, need not be removed.

Figure 12L:
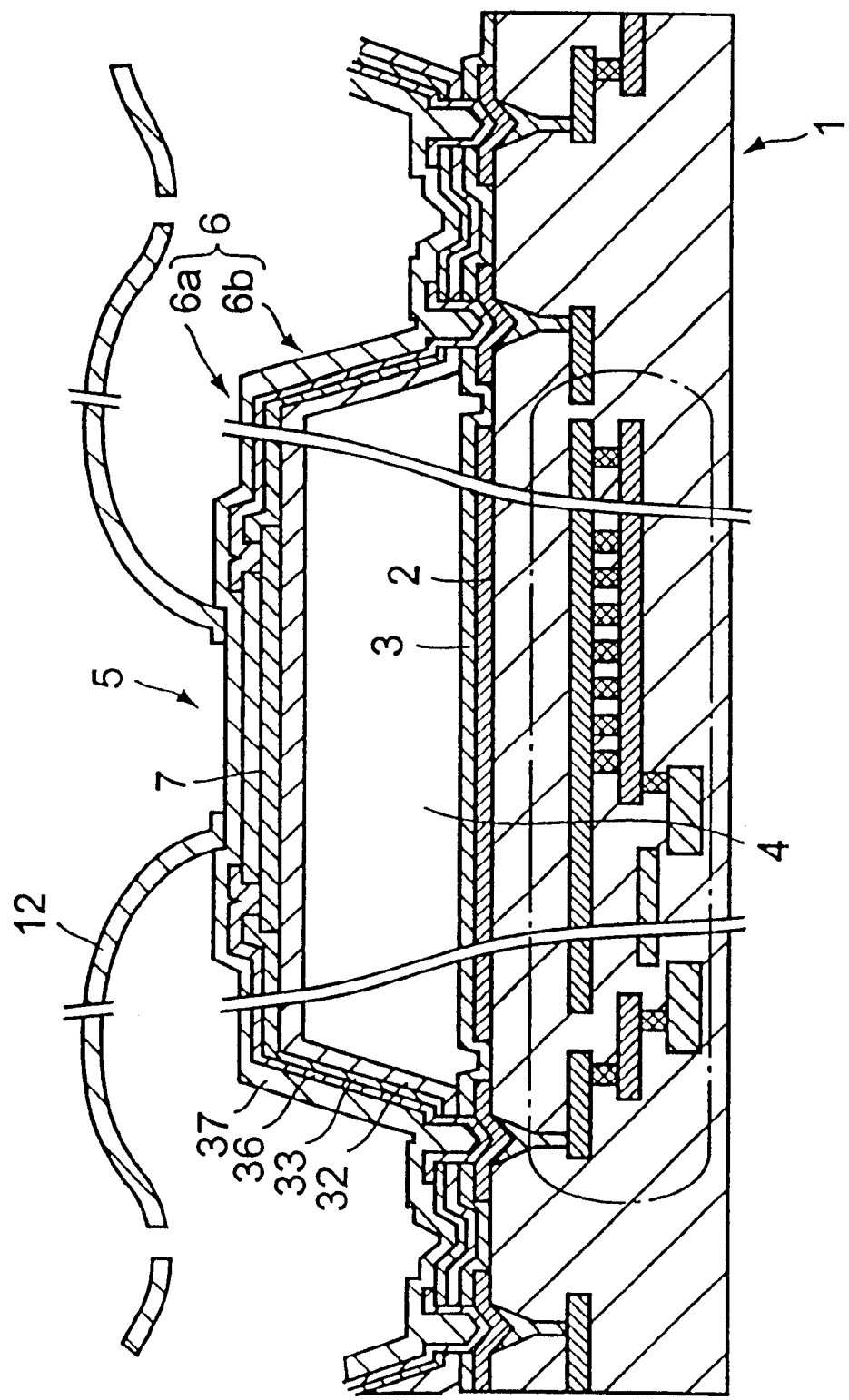

In FIG. 12L, the space on the silicon substrate 1 side of shield 12 and cavity 4 on the silicon substrate 1 side of infrared photosensitive area 5 are formed by removing first sacrificial layer 31 and second sacrificial layer 40 by ashing using a plasma of $O_2$ gas. In this way, a thermal isolation structure in which infrared photosensitive area 5 provided with shield 12 is held up by supports 6 above silicon substrate 1 is formed in the thermal infrared detector. A thermal infrared detector having the above-described thermal isolation structure is fabricated by carrying out the above-described steps.

Second Working Example

Figure 13:
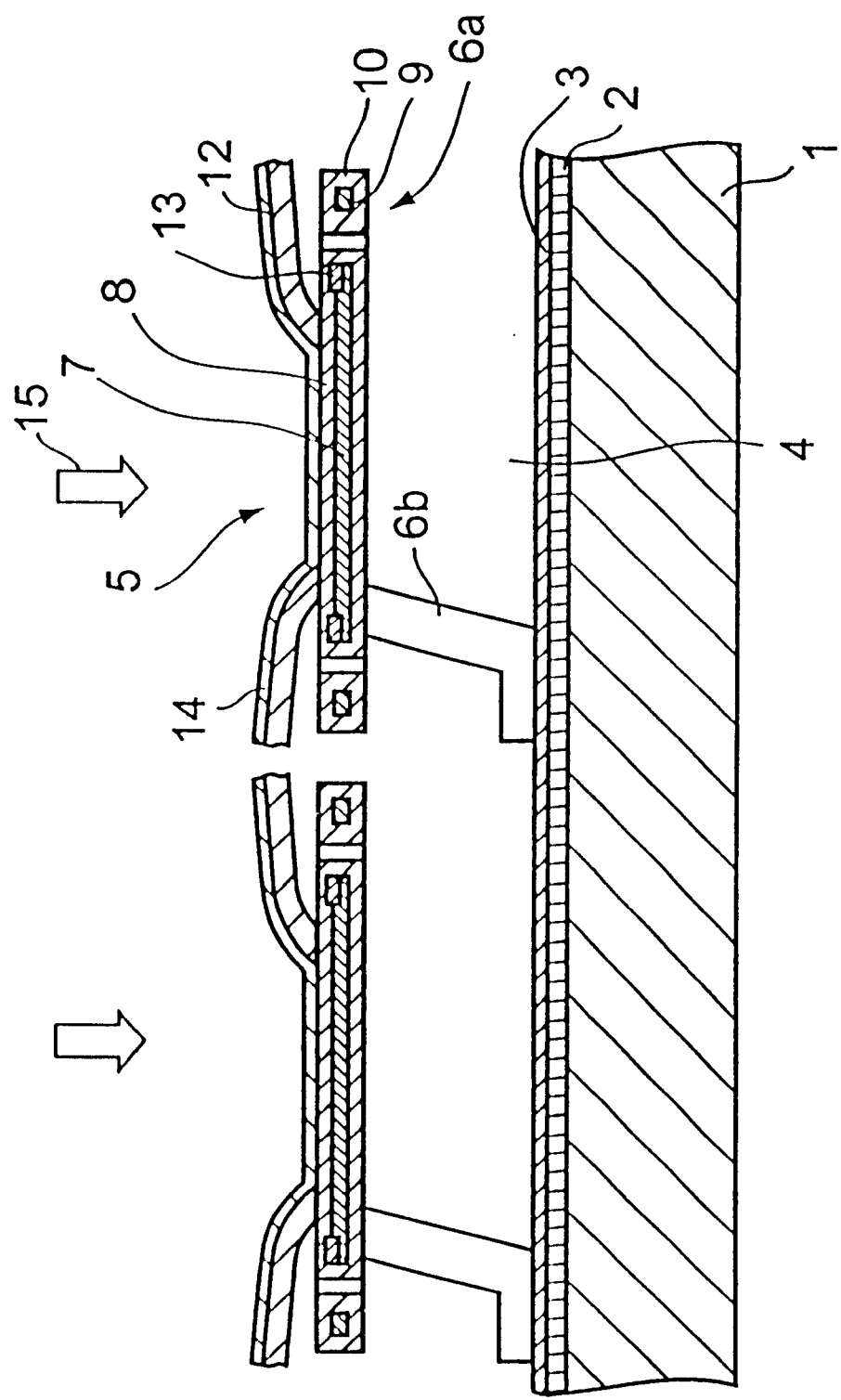
FIGS. 13 and 14 are sectional views showing the thermal infrared detector according to the second embodiment of the present invention.
Figure 14:
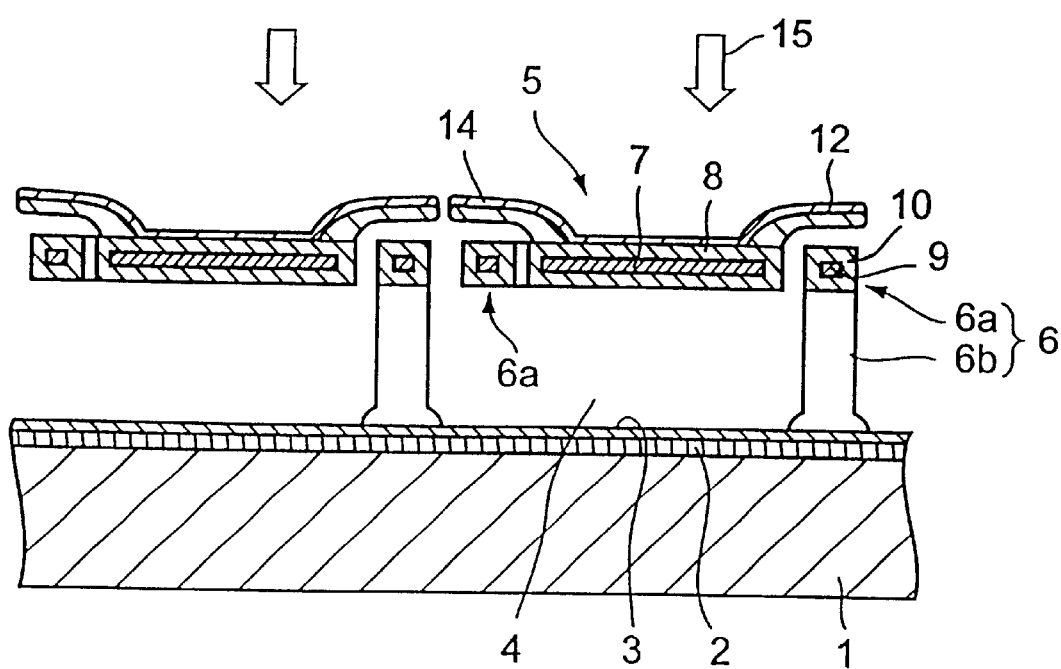

Referring now to FIGS. 13 and 14, the main point of difference between the thermal infrared detector according to the second embodiment of this invention and that of the first embodiment consists in the formation of a metal thin-film that is heated by interference between infrared rays in the infrared photosensitive area. In FIGS. 13 and 14, components of the same constitution as the first embodiment are identified by the same reference numerals, and the following explanation focuses on those points that differ from the thermal infrared detector of the first embodiment.

As shown in each of FIGS. 13 and 14, the configuration of the thermal infrared detector of this embodiment is such that metal film 14 of high thermal conductivity is formed as an infrared ray absorbing part on the surfaces of shield 12 and dielectric protective film 8 that are directed away from silicon substrate 1 in the thermal infrared detector of the first embodiment. Metal thin-film 14 is thus formed on the surface of infrared photosensitive area 5 that is directed away from silicon substrate 1, and this metal thin-film 14 extends over the entire surface of shield 12 that is directed away from silicon substrate 1. A nichrom (NiCr) film having a thickness of 3 nm is used as metal thin-film 14, and metal thin-film 14 is set to a vacuum impedance of 377 $\Omega$/Sq. A silicon nitride film having a thickness of 500 nm that is transparent to infrared light of the 3–5 $\mu$m wavelength region and that absorbs infrared light of the 10 $\mu$m wavelength region is employed as shield 12.

In addition, the space between portions of metal thin-film 14 that contact dielectric protective film 8 and infrared ray reflecting film 2 is set to approximately 1 $\mu$m.

The interference effect between infrared rays at metal thin-film 14 is thus used for infrared light of the 3–5 $\mu$m wavelength region, and infrared light of this wavelength band is absorbed by metal thin-film 14. An optical resonance structure that is constituted by metal thin-film 14 and infrared ray reflecting film 2 is thus formed in the thermal infrared detector of this embodiment. Infrared light of the 10 $\mu$m wavelength region is effectively absorbed by the silicon nitride films of shield 12 and dielectric protective film 8. In this case, the thermal capacity of shield 12 is $5.8 \times 10^{-10}$ J/K, and when combined with the thermal capacity of infrared photosensitive area 5 amounts to no more than $1.5 \times 10^{-9}$ J/K. The thermal time constant at this time becomes 18 msec, which is sufficiently lower than the time interval of 33 msec that corresponds to the frame rate of television, whereby problems relating to conversion to real-time imaging can be eliminated.

In contrast to the thermal infrared detector of this embodiment, metal thin-film 14 is not formed in infrared photosensitive area 5 of the detector of the first embodiment, and consequently, only infrared light of the 10 $\mu$m wavelength band is absorbed by dielectric protective film 8 and shield 12 when silicon nitride films are used as these components. In such a thermal infrared detector according to the first embodiment, there is virtually no difference in the signal-to-noise ratio when compared to the thermal infrared detector of this embodiment as long as heat radiation from a body at 300 K is being detected. When infrared light of the 10 $\mu$m wavelength region is to be absorbed at shield 12, an amorphous silicon carbide film, a silicon oxide film, a silicon oxynitride film, or a laminated film in which at least any two of these films are combined can be used as shield 12.

A material that is transparent to infrared light of the 3–5 $\mu$m wavelength band can be used as the material of dielectric protective film 8, and materials such as zinc sulfide (ZnS), zinc selenide (ZnSe), calcium fluoride ($CaF_2$), barium fluoride ($BaF_2$), or germanium (Ge) may be used in addition to SiN and silicon monoxide (Sio). Silicon nitride (SiN), however, has the property of absorbing infrared light of the 9–13 $\mu$m wavelength region, and silicon monoxide (SiO) has the property of strongly absorbing infrared light having a wavelength of 9.5 $\mu$m.

The material of dielectric protective film 8 and second dielectric protective film 10 of supports 6 is preferably the same because a difference between the material of dielectric protective film 8 and the material of second dielectric protective film 10 results in an increase in the number of fabrication steps, a more complex fabrication method, and increased difficulties in the fabrication of the thermal infrared detector. In this case, a material having low thermal conductivity must be used as the material of second dielectric protective film 10. Zinc selenide (ZnS), calcium fluoride (CaF$_2$), barium fluoride (BaF$_2$), and germanium (Ge) have high thermal conductivity and therefore are not suitable as the material of second dielectric protective film 10.

Next, regarding the operating principles of the thermal infrared detector of this embodiment, when infrared light 15 is first irradiated upon metal thin-film 14, a portion of incident infrared light 15 is reflected by metal thin-film 14. The remaining portion of infrared light 15 that is incident to metal thin-film 14 passes through metal thin-film 14 and proceeds toward silicon substrate 1. Infrared light 15 that has passed through metal thin-film 14 is reflected back toward metal thin-film 14 by infrared ray reflecting film 2, metal wiring 9, and contact pads 11 and is again irradiated upon metal thin-film 14. Here, infrared light 15 that is reflected by infrared ray reflecting film 2 and again irradiated upon metal thin-film 14 is transmitted by shield 12, dielectric protective film 8, or second dielectric protective film 10.

Infrared light 15 that is reflected by infrared ray reflecting film 2 and again irradiated onto metal thin-film 14 causes destructive interference with the original infrared light that is to be reflected by metal thin-film 14, and the mutually interfering infrared rays are absorbed by free electrons inside metal thin-film 14 to become heat. Metal thin-film 14 is thus heated, its temperature rises, and the heat of metal thin-film 14 is conveyed to thermistor-bolometer thin-film 7 by way of dielectric protective film 8 that contacts metal thin-film 14 and shield 12. In addition, infrared light of the 10 µm wavelength band is directly absorbed by shield 12, and shield 12 is heated by this infrared light. The heat of shield 12 is conveyed to thermistor-bolometer thin-film 7 by way of metal thin-film 14 and dielectric protective film 8. In this case, metal thin-film 14 that is formed on shield 12 and dielectric protective film 8 rapidly conveys the heat of shield 12 and dielectric protective film 8 to thermistor-bolometer thin-film 7.

The temperature of thermistor-bolometer thin-film 7 thus changes due to the heat of each of metal thin-film 14, shield 12, and dielectric protective film 8, and the resistance of thermistor-bolometer thin-film 7 consequently changes. This change in resistance is converted to a voltage change and read out as an electrical signal by read-out circuit 16 inside silicon substrate 1, and then converted by an outside circuit to an infrared image based on this electrical signal. In the thermal infrared detector of this embodiment, infrared ray reflecting film 2, metal wiring 9 inside beams 6a, and contact pads 11 are preferably flat in order that each of infrared ray reflecting film 2, metal wiring 9 inside beams 6a, and contact pads 11 may reflect infrared light and cause infrared rays to mutually interfere.

As described in the foregoing explanation, the vacuum impedance of metal thin-film 14 is set to 377 Ω/Sq., and if λ is the wavelength of the infrared light that is absorbed at metal thin-film 14 and n is the effective refractive index between metal thin-film 14 and infrared ray reflecting film 2, the space between metal thin-film 14 and infrared ray reflecting film 2 must be set to $\lambda/(4n)$. In this case, the thickness of infrared photosensitive area 5 is $d_x$; the distance between infrared photosensitive area 5 and infrared ray reflecting film 2, i.e., the height of cavity 4, is $d_0$; the refractive index of dielectric protective film 8 is $n_x$; the refractive index of air inside cavity 4 is $n_0$; and the above-described effective refractive index approximates $n=(n_x \cdot d_x + n_0 \cdot d_0)/(d_x+d_0)$. The value of the refractive index $n_0$ of air inside cavity 4 is 1.

If the space between the portion of metal thin-film 14 that contacts dielectric protective film 8 and infrared ray reflecting film 2 is set to the above-described $\lambda/(4n)$, the space between the portion of metal thin-film 14 that contacts shield 12 and infrared ray reflecting film 2 will be greater than $\lambda/(4n)$. In this case, infrared light of a wavelength that corresponds to the space between metal thin-film 14 and infrared ray reflecting film 2 will be absorbed at the portion of metal thin-film 14 that contacts shield 12.

Next, regarding the method of fabricating the thermal infrared detector of this embodiment, the same steps are performed as the steps of FIGS. 12A–12J in the fabrication method explained in the first embodiment. In cases in which, for example, the materials and thicknesses of the dielectric protective films that cover thermistor-bolometer thin-film 7 and shield 12 differ from the first embodiment in these steps of FIGS. 12A–12J, each of these films should be formed in accordance with the materials and film thicknesses. The steps following the process of FIG. 12J in the fabrication method that was explained in the first embodiment are next described with reference to FIGS. 15A–15C.

In FIG. 15A, after forming dielectric protective film 41, metal thin-film 14 is formed as a fifth material film by a sputtering method over the entire surface of dielectric protective film 41. A material such as titanium nitride or nichrom is used as metal thin-film 14.

Figure 15B:
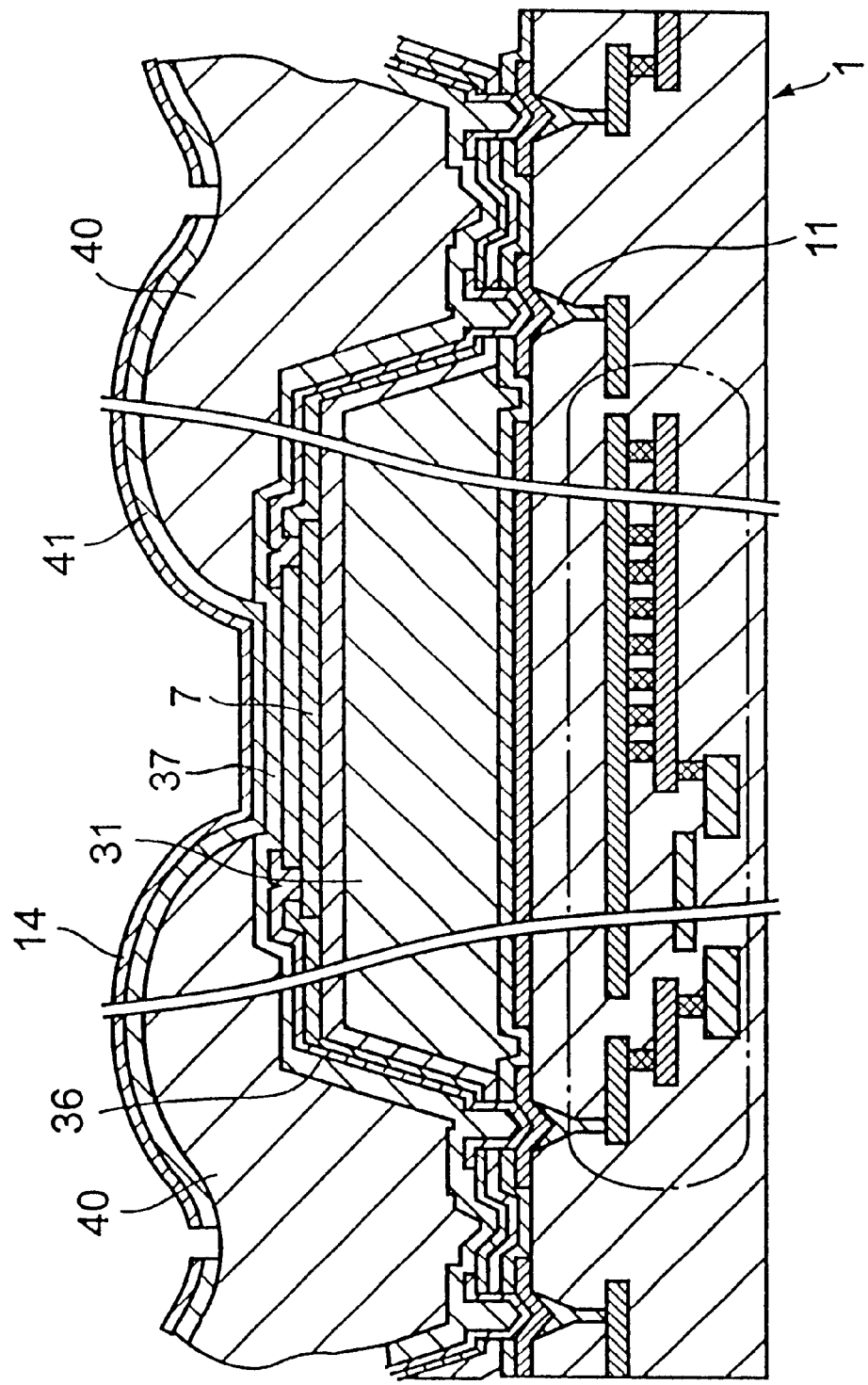

In FIG. 15B, following an exposure and development process, metal thin-film 14 is etched to a slit form by means of a plasma of a gas mixture of Cl$_2$ and BCl$_3$ in order to form shield 12 that absorbs infrared light. Next, dielectric protective film 41 is etched in slit form by means of a plasma of a gas mixture of CF$_4$ and O$_2$ or a gas mixture of CHF$_3$ and O$_2$ to partially expose second sacrificial layer 40. In this way, shield 12 is formed that is composed of dielectric protective film 41 that remains on second sacrificial layer 40 and that projects from dielectric protective film 37.

Figure 15C:
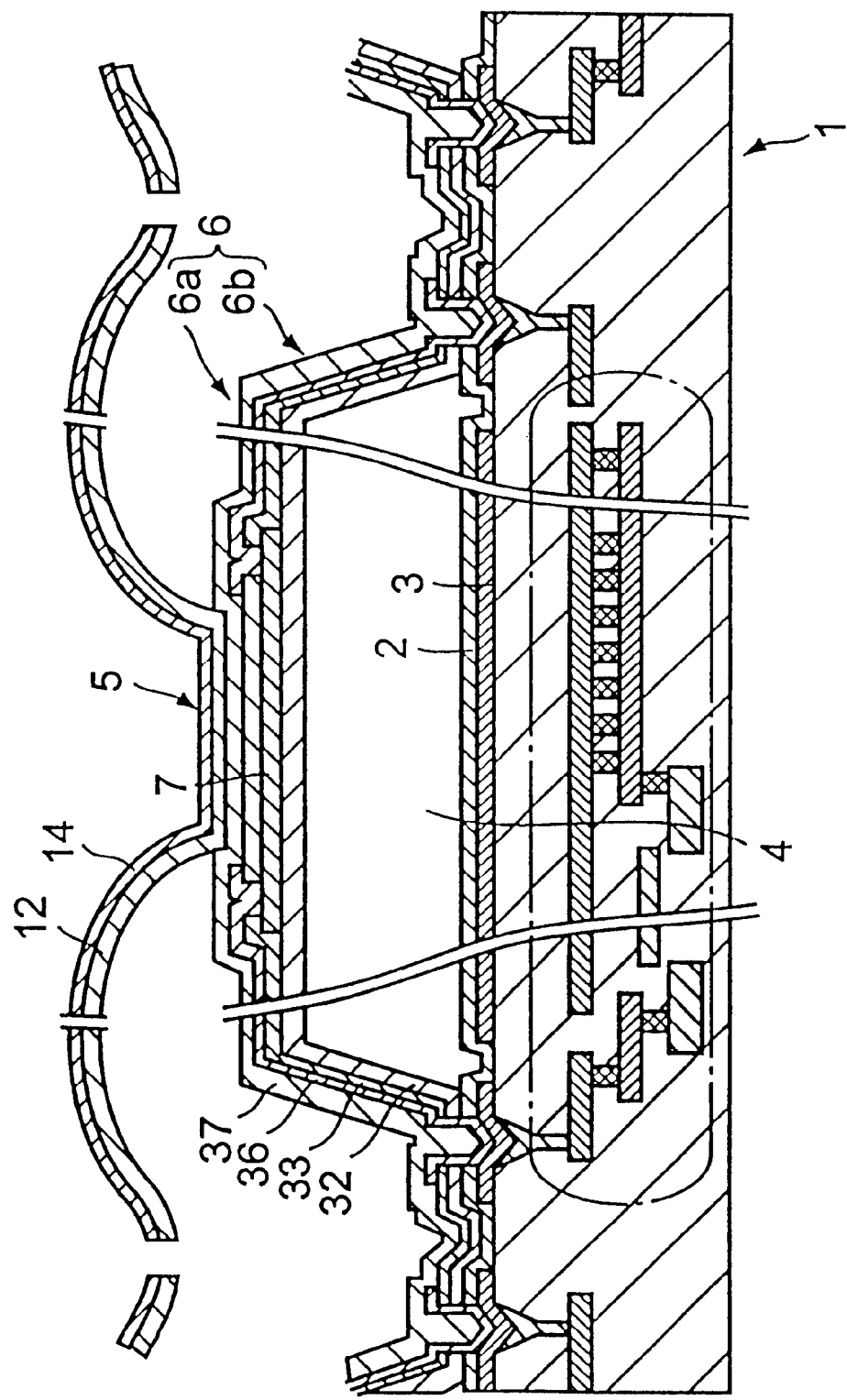

Next, in FIG. 15C, first sacrificial layer 31 and second sacrificial layer 40 are removed by ashing using a plasma of O$_2$ gas to form the space on the silicon substrate 1 side of shield 12 and cavity 4 on the silicon substrate 1 side of infrared photosensitive area 5. A thermal isolation structure is thus formed in the thermal infrared detector in which infrared photosensitive area 5 provided with shield 12 and metal thin-film 14 is held up above silicon substrate 1 by supports 6. A thermal infrared detector that includes the above-described thermal isolation structure is fabricated by carrying out the above-described steps.

Figure 16:
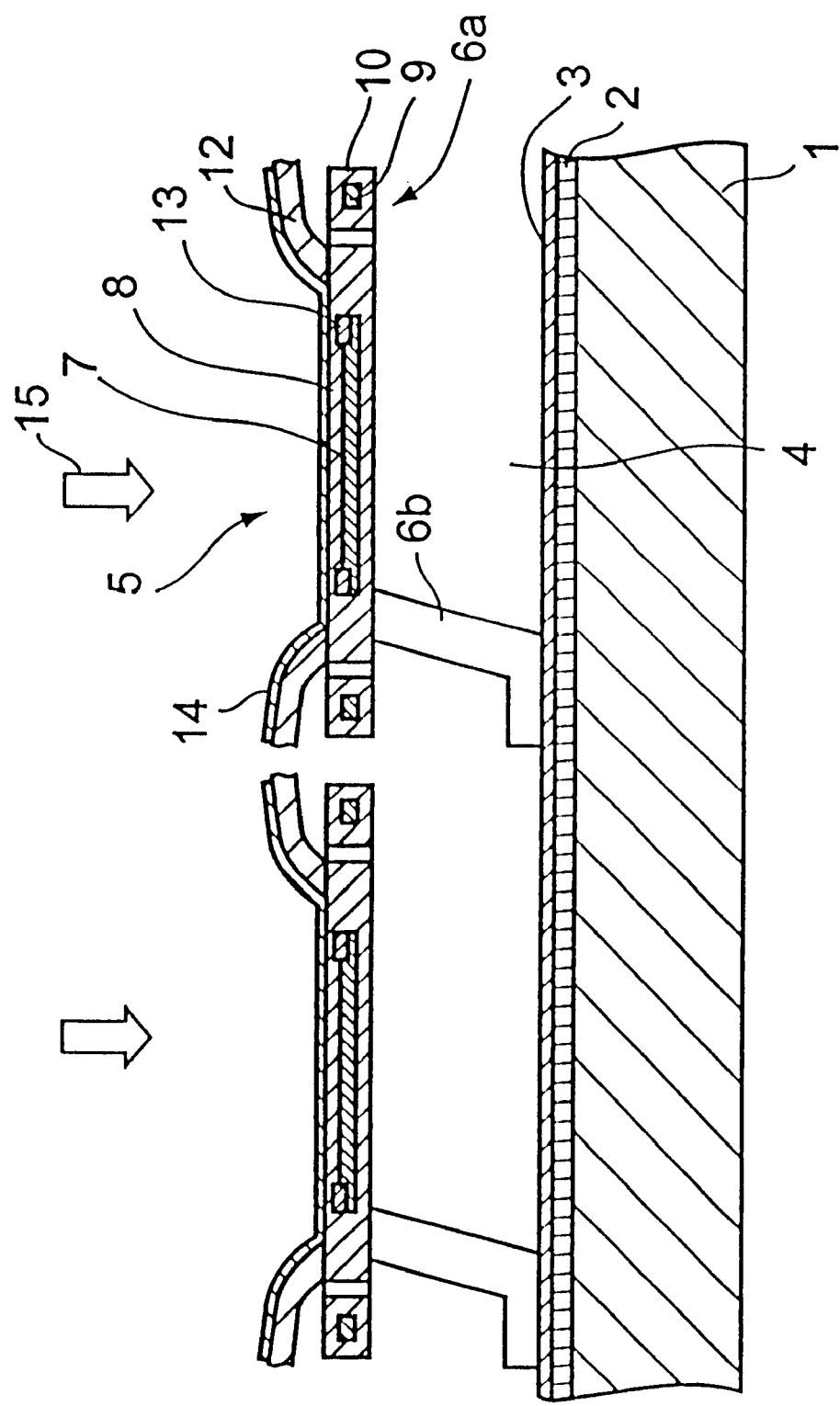
FIG. 16 is a sectional view showing a modification of the thermal infrared detector that is shown in FIGS. 13 and 14.

In the modification of the thermal infrared detector that is shown in FIG. 16, the main difference from the thermal infrared detector shown in FIGS. 13 and 14 is the position of the base of shield 12 and the positions of electrodes 13. As shown in FIG. 16, the position of the base of shield 12 that is in the proximity of electrodes 13 may be arranged at the edge of infrared photosensitive area 5, and the position of electrodes 13 may be arranged inside infrared photosensitive area 5 so as to be separated from the base of shield 12 as seen from the upper surface of infrared photosensitive area 5. According to the position of these electrodes 13, thermistor-bolometer thin-film 7 is narrower than the case that is shown in FIGS. 13 and 14.

Here, if the base of shield 12, i.e., the portion that connects to dielectric protective film 8, is directly above electrodes 13, a portion of the heat of shield 12 will be transmitted by electrodes 13 and metal wiring 9 inside beam 6a to escape to silicon substrate 1, which is a heat sink, and sensitivity will slightly drop. Accordingly, in the thermal infrared detectors of the first and second embodiments, as with the thermal infrared detector shown in FIG. 16, electrodes 13 are arranged so as not to lie directly below the base of shield 12. In this way, The direct transmission of heat from metal thin-film 14 over shield 12 and heat from shield 12 to electrodes 13 is thus prevented and a drop in sensitivity is suppressed. As in the thermal infrared detectors of the first and second embodiments, the base of shield 12 is arranged more toward the inside of infrared photosensitive area 5 than electrodes 13 as seen from the upper surface of infrared photosensitive area 5.

Figure 17:
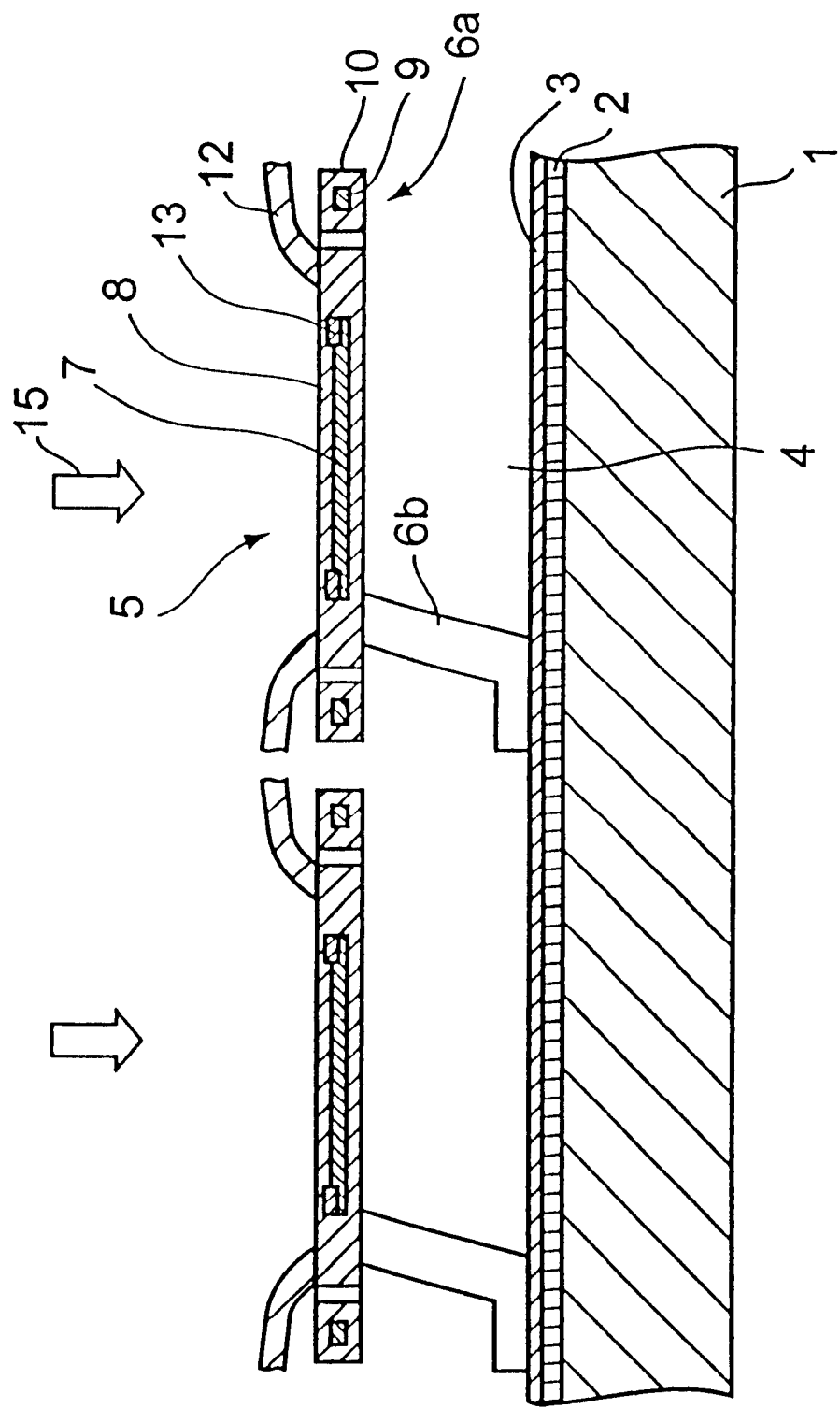
FIG. 17 is a sectional view showing a modification of the thermal infrared detector that is shown in FIGS. 7–11.

In the thermal infrared detector of the first embodiment that is shown in FIGS. 7–11, as with the thermal infrared detector shown in FIG. 16, the position of the base of shield 12 that is in proximity to electrodes 13 may be arranged at the edge of infrared photosensitive area 5, and electrodes 13 may be arranged inside infrared photosensitive area 5 such that electrodes 13 do not overlap the base of shield 12 as seen from the upper surface of infrared photosensitive area 5. As shown in FIG. 17, electrodes 13 may also be arranged so as not to overlap with the base of shield 12 as seen from the upper surface of infrared photosensitive area 5 in a thermal infrared detector in which metal thin-film 14 is not formed on shield 12 and on infrared photosensitive area 5.

The thermal infrared detector of this invention is not limited to the configurations described hereinabove, and the present invention includes all thermal infrared detectors that are configured so as to increase the fill factor by using a shield to absorb infrared light. For example, the shield structure that is characteristic of this invention may be applied to a thermal infrared detector having both picture elements that absorb infrared light by only an infrared ray absorbing part as in the first embodiment and picture elements that are provided with a metal thin-film that is heated by interference between infrared rays as in the second embodiment. In some picture elements of such a thermal infrared detector, a metal thin-film that has been adjusted to a vacuum impedance of 377 Ω/Sq. is formed in the infrared photosensitive area, and an optical resonance structure is produced in which the distance between this metal thin-film and the infrared ray reflecting film on the substrate is made approximately 1 μm. Infrared light that is mainly in the 3–5 μm wavelength band is therefore absorbed and detected in these picture elements. In this case, a material that is transparent to infrared light of the 3–5 μm wavelength region such as zinc sulfide (ZnS), zinc selenide (ZnSe), calcium fluoride (CaF$_2$), barium fluoride (BaF$_2$), or germanium (Ge) is used as the material of the dielectric protective film that covers the thermistor-bolometer thin-film. In other picture elements, a metal thin-film is not formed and a material such as silicon nitride (SiN), silicon oxide (SiO), silicon oxynitride (SiON), or silicon carbide (SiC) that absorbs infrared light of the 10 μm wavelength band is used as the dielectric protective film that covers the thermistor-bolometer thin-film. Infrared light of the 10 μm wavelength band is thus absorbed and detected in these other picture elements.

In a thermal infrared detector that detects infrared light of a plurality of wavelength bands in one such array detector, the fill factor can be raised by providing a shield according to the method of absorbing infrared light in each of the picture elements. One example has been described here, and the distance between the infrared ray reflecting film and the metal thin-film that constitute the optical resonance structure can be changed in accordance with λ/(4 n) if there is a change in the wavelength band that is to be detected.

While preferred embodiments of the present invention have been described using specific terms, such description is for illustrative purposes only, and it is to be understood that changes and variations may be made without departing from the spirit or scope of the following claims.

What is claimed is:

1. A thermal infrared detector, comprising: a substrate provided with contact pads;
    an infrared photosensitive area that is separated by a space from one surface of said substrate and arranged above said surface, and that is provided with an infrared ray absorbing part that absorbs infrared light and is thus heated by the infrared light, a thermal detector in which temperature is changed by heat from said infrared ray absorbing part and that detects temperature change.of said infrared ray absorbing part, and electrodes that are electrically connected to said thermal detector;
    supports for holding said infrared photosensitive area above one surface of said substrate, at least a portion of said supports being formed from a conductive material so as to constitute wiring that electrically connects the electrodes of said infrared photosensitive area to said contact pads of said substrate; and
    a shield that projects from the infrared ray absorbing part of said infrared photosensitive area and that covers, with an interposed space, the surface of said electrodes that is directed away from said substrate.

2. A thermal infrared detector according to claim 1 wherein said shield covers, with an interposed space, said contact pads and the surface of said supports that is directed away from said substrate.

3. A thermal infrared detector according to claim 1 that further comprises:
    an infrared ray reflecting film that is formed on the surface of said substrate that is directed toward said infrared photosensitive area; and
    a first dielectric protective film that is formed on the surface of said infrared ray reflecting film so as to cover said infrared ray reflecting film;
    wherein said infrared photosensitive area is held above said first dielectric protective film by said supports.

4. A thermal infrared detector according to claim 3:
    wherein at least a portion of said infrared ray absorbing part is arranged on the surface of said thermal detector that is directed away from said substrate;
    and comprising a metal thin-film that is formed on the surface of said infrared ray absorbing part that is directed away from said substrate and on the surface of said shield that is directed away from said substrate.

5. A thermal infrared detector according to claim 1 wherein said substrate comprises:
    a read-out circuit that is electrically connected to said contact pads of said substrate and that converts temperature change of said infrared ray absorbing part that is detected by said thermal detector into an electrical signal and reads out said electrical signal.

6. A thermal infrared detector according to claim 1 wherein said supports are constituted by:
    a conductive material that constitutes wiring for electrically connecting said electrodes to said contact pads of said substrate; and a second dielectric protective film that covers said conductive material.

7. A thermal infrared detector according to claim 1 wherein the material of said shield absorbs infrared light.

8. A thermal infrared detector according to claim 1 wherein said thermal detect or is one of a thermistor-bolometer thin-film, a pyroelectric thin-film, and a thermopile.

9. A thermal infrared detector comprising a substrate provided with contact pads;

an infrared photosensitive area that is separated by a space from one surface of said substrate and arranged above said surface, and that is provided with an infrared ray absorbing part that absorbs infrared light and is thus heated by the infrared light, a thermal detector in which temperature is changed by heat from said infrared ray absorbing part and that detects temperature change of said infrared ray absorbing part, and electrodes that are electrically connected to said thermal detector;

supports for holding said infrared photosensitive area above one surface of said substrate, at least a portion of said supports being formed from a conductive material so as to constitute wiring that electrically connects the electrodes of said infrared photosensitive area to said contact pads of said substrate; and a shield that projects from portions of said infrared ray absorbing part other than portions corresponding to said electrodes, and that covers, with an interposed space, the surface of said supports that is directed away from said substrate, and that further covers contact pads of said substrate with an interposed space.

10. A thermal infrared detector according to claim 9 that further comprises:

an infrared ray reflecting film that is formed on the surface of said substrate that is directed toward said infrared photosensitive area; and a first dielectric protective film that is formed on the surface of said infrared ray reflecting film so as to cover said infrared ray reflecting film;

wherein said infrared photosensitive area is held above said first dielectric protective film by said supports.

11. A thermal infrared detector according to claim 10:

wherein at least a portion of said infrared ray absorbing part is arranged on the surface of said thermal detector that is directed away from said substrate;

and comprising a metal thin-film that is formed on the surface of said infrared ray absorbing part that is directed away from said substrate and on the surface of said shield that is directed away from said substrate.

12. A thermal infrared detector according to claim 9 wherein said substrate comprises:

a read-out circuit that is electrically connected to said contact pads of said substrate and that converts temperature change of said infrared ray absorbing part that is detected by said thermal detector into an electrical signal and reads out said electrical signal.

13. A thermal infrared detector according to claim 9 wherein said. supports are constituted by:

a conductive material that constitutes wiring for electrically connecting said electrodes to said contact pads of said substrate; and a second dielectric protective film that covers said conductive material.

14. A thermal infrared detector according to claim 9 wherein the material of said shield absorbs infrared light.

15. A thermal infrared detector according to claim,9 wherein said thermal detector is one of a thermistor-bolometer thin-film, a pyroelectric thin-film, and a thermopile.

16. A thermal infrared detector, comprising:

an infrared photosensitive area that is provided with an infrared ray absorbing part that absorbs infrared light and is thus heated by the infrared light, a thermal detector in which temperature is changed by heat from said infrared ray absorbing part and that detects temperature change of said infrared ray absorbing part, and electrodes that are electrically connected to said thermal detector;

a substrate provided with: contact pads that are electrically connected to said electrodes of said infrared photosensitive area; and a read-out circuit that is electrically connected to said contact pads and that converts temperature change of said infrared ray absorbing part that is detected by said thermal detector to an electrical signal and reads out said electrical signal;

an infrared ray reflecting film that is formed on the side of said substrate on which said contact pads are present;

a first dielectric protective film that is formed on the surface of said infrared ray reflecting film so as to cover said infrared ray reflecting film;

supports for holding said infrared photosensitive area above said first dielectric protective film and that are composed of wiring material that electrically connects said electrodes to said contact pads and a second dielectric protective film that covers said wiring material; and a shield that projects from portions of said infrared ray absorbing part other than portions corresponding to said electrodes, that covers, with an interposed space, the surfaces of said electrodes and said supports that are directed away from said substrate, and that further covers, with an interposed space, said contact pads of said substrate.

17. A thermal infrared detector according to claim 16 wherein the material of said shield absorbs infrared light.

18. A thermal infrared detector according to claim 16 wherein said thermal detector is one of a thermistor-bolometer thin-film, a pyroelectric thin-film, and a thermopile.

19. A thermal infrared detector, comprising:

an infrared photosensitive area that is provided with an infrared ray absorbing part that absorbs infrared light and is thus heated by the infrared light, a thermal detector in which temperature is changed by heat from said infrared ray absorbing part and that detects temperature change of said infrared ray absorbing part, and electrodes that are electrically connected to said thermal detector;

a substrate provided with contact pads that are electrically connected to said electrodes;

an infrared ray reflecting film that is formed on the side of said substrate on which said contact pads are present;

a first dielectric protective film that is formed on the surface of said infrared ray reflecting film so as to cover said infrared ray reflecting film;

supports for holding said infrared photosensitive area above said first dielectric protective film and that are composed of wiring material that electrically connects said electrodes to said contact pads and a second dielectric protective film that covers said wiring material; and a shield that projects from portions of said infrared ray absorbing part other than portions corresponding to said electrodes, that covers, with an interposed space, the surfaces of said electrodes and said supports that are directed away from said substrate, and that further covers, with an interposed space, said contact pads of said substrate.

20. A thermal infrared detector according to claim 19 wherein the material of said shield absorbs infrared light.

21. A thermal infrared detector according to claim 19 wherein said thermal detector is one of a thermistor-bolometer thin-film, a pyroelectric thin-film, and a thermopile.

22. A thermal infrared detector, comprising:
an infrared photosensitive area that is provided with a metal thin-film that is irradiated by infrared light, a thermal detector in which temperature is changed by heat from a dielectric film that contacts said metal thin-film and that detects temperature change of said metal thin-film, and electrodes that are electrically connected to said thermal detector;
a substrate provided with contact pads that are electrically connected to said electrodes;
an infrared ray reflecting film that is formed on the surface of said substrate on which said contact pads are present and that, of infrared light that is irradiated upon said metal thin-film of said infrared photosensitive area, reflects the infrared light that has been transmitted by said metal thin-film toward said metal thin-film to heat said metal thin-film by interference between infrared rays on said metal thin-film;
a first dielectric protective film that is formed on the surface of said infrared ray reflecting film so as to cover said infrared ray reflecting film;
supports for holding said infrared photosensitive area above said first dielectric protective film that are composed of wiring material that electrically connects said electrodes to said contact pads and a second dielectric protective film that covers said wiring material; and
a shield that projects from said dielectric film of said infrared photosensitive area, that covers, with an interposed space, the surfaces of said electrodes and said supports that are directed away from said substrate, and that further covers, with an interposed space, said contact pads of said substrate;
wherein said metal thin-film extends over the entire surface of said shield that is directed away from said substrate.

23. A thermal infrared detector according to claim 22 wherein said thermal detector is one of a thermistor-bolometer thin-film, a pyroelectric thin-film, and a thermopile.

24. A method of fabricating a thermal infrared detector, said thermal infrared detector comprising:
an infrared photosensitive area that is provided with an infrared ray absorbing part that absorbs infrared light, a thermal detector that detects temperature change of said infrared ray absorbing part, and electrodes that are electrically connected to said thermal detector;
a substrate provided with contact pads that are electrically connected to said electrodes;
an infrared ray reflecting film that is formed on the surface of said substrate on which said contact pads are present;
a first dielectric protective film that is formed on the surface of said infrared ray reflecting film so as to cover said infrared ray reflecting film;
supports for holding said infrared photosensitive area above said first dielectric protective film that are composed of wiring material that electrically connects said electrodes to said contact pads and a second dielectric protective film that covers said wiring material; and
a shield that projects from portions of said infrared ray absorbing part other than portions corresponding to said electrodes, that covers the surfaces of said electrodes and said supports that are directed away from said substrate with an interposed space between said shield and both of said electrodes and said supports, and that further covers said contact pads of said substrate with an interposed space;
said method of fabricating said thermal infrared detector comprising steps of:
preparing said substrate having said contact pads;
forming said infrared ray reflecting film on the surface of said substrate on which said contact pads are present at portions that correspond to said infrared photosensitive area;
forming said first dielectric protective film on the surfaces of each of said infrared ray reflecting film and said substrate so as to cover said infrared ray reflecting film;
forming a first sacrificial layer on the surface of said substrate on which said contact pads are present at portions corresponding to said infrared photosensitive area for forming a space between said substrate and said infrared photosensitive area;
forming a first material film on the surfaces of each of said first sacrificial layer and said first dielectric protective film so as to cover said first sacrificial layer;
forming said thermal detector on the surface of said first material film at portions corresponding to said first sacrificial layer;
forming a second material film on the surfaces of each of said thermal detector and said first material film so as to cover said thermal detector;
forming first openings at portions corresponding to said contact pads on each of said first dielectric protective film and said first and second material films;
forming second openings so as to expose said thermal detector at portions corresponding to said electrodes on portions of said second material film that overlie said thermal detector;
forming a metal film inside said first and second openings as well as on the surface of said second material film;
patterning said metal film so as to expose said second material film and forming said electrodes of said infrared photosensitive area and wiring material of said supports;
forming a third material film on the surfaces of said metal film and said second material film so as to cover said metal film;
patterning said first to third material films so as to expose said first sacrificial layer, and forming said infrared ray absorbing part that is constituted by portions of each of said first to third material films and said second dielectric protective film that is constituted by other portions of each of said first to third material films;
forming a second sacrificial layer on the surface of said third material film and exposed surfaces of said first sacrificial layer for forming a space between said shield and said electrodes of said infrared photosensitive area, a space between said shield and said supports, and a space between said shield and said contact pads of said substrate;

patterning said second sacrificial layer so as to expose part of portions of said third material film that correspond to said thermal detector;

forming a fourth material film on the surface of said second sacrificial layer and on exposed surfaces of said third material film;

patterning said fourth material film so as to expose a portion of said second sacrificial layer and forming said shield that is constituted by a portion of said fourth material film; and removing said first and second sacrificial layers.

25. A method of fabricating a thermal infrared detector according to claim 24 that further includes a step for forming a metal thin-film on the surface of said fourth material film before said step of patterning said fourth material film; and wherein, in the step of patterning said fourth material film, said metal thin-film is patterned together with said fourth material film and said metal thin-film is left on the surfaces of each of said shield and said infrared ray absorbing part.

26. A method of fabricating a thermal infrared detector according to claim 24 wherein polyimide is used as the material of said first and second sacrificial layers.

27. A method of fabricating a thermal infrared detector, said thermal infrared detector comprising:

an infrared photosensitive area that is provided with a metal thin-film that is irradiated by infrared light, a thermal detector that detects temperature change of said metal thin-film by heat transmitted from a dielectric film that contacts said metal thin-film, and electrodes that are electrically connected to said thermal detector;

a substrate provided with contact pads that are electrically connected to said electrodes;

an infrared ray reflecting film that is formed on the surface of said substrate on which said contact pads are present and that, of said infrared light that is irradiated upon said metal thin-film of said infrared photosensitive area, reflects the infrared light that has been transmitted by said metal thin-film toward said metal thin-film to heat said metal thin-film by interference between infrared rays on said metal thin-film;

a first dielectric protective film that is formed on the surface of said infrared ray reflecting film so as to cover said infrared ray reflecting film;

supports for holding said infrared photosensitive area above said first dielectric protective film and that are composed of wiring material that electrically connects said electrodes to said contact pads and a second dielectric protective film that covers said wiring material; and a shield that projects from said dielectric film of said infrared photosensitive area, that covers the surfaces of said electrodes and said supports that are directed away from said substrate with an interposed space, and that further covers said contact pads of said substrate with an interposed space;

wherein said metal thin-film extends over the entire surface of said shield that is directed away from said substrate;

said method of fabricating said thermal infrared detector comprising steps of:

preparing said substrate having said contact pads;

forming said infrared ray reflecting film on the surface of said substrate on which said contact pads are present at portions that correspond to said infrared photosensitive area;

forming said first dielectric protective film on the surfaces of each of said infrared ray reflecting film and said substrate so as to cover said infrared ray reflecting film;

forming a first sacrificial layer on the surface of said substrate on which said contact pads are present at portions corresponding to said infrared photosensitive area for forming a space between said substrate and said infrared photosensitive area;

forming a first material film on the surfaces of each of said first sacrificial layer and said first dielectric protective film so as to cover said first sacrificial layer;

forming said thermal detector on the surface of said first material film at portions corresponding to said first sacrificial layer;

forming a second material film on the surfaces of each of said thermal detector and said first material film so as to cover said thermal detector;

forming first openings at portions corresponding to said contact pads on each of said first dielectric protective film and said first and second material films;

forming second openings so as to expose said thermal detector at portions corresponding to said electrodes on portions of said second material film that overlie said thermal detector;

forming a metal film inside said first and second openings as well as on the surface of said second material film;

patterning said metal film so as to expose said second material film and forming said electrodes of said infrared photosensitive area and wiring material of said supports;

forming a third material film on the surfaces of said metal film and said second material film so as to cover said metal film;

patterning said first to third material films so as to expose said first sacrificial layer, and forming: said dielectric film of said infrared photosensitive area that is constituted by portions of each of said first to third material films; and said second dielectric protective film that is constituted by other portions of each of said first to third material films;

forming a second sacrificial layer on the surface of said third material film and exposed surfaces of said first sacrificial layer for forming a space between said shield and said electrodes of said infrared photosensitive area, a space between said shield and said supports, and a space between said shield and said contact pads of said substrate;

patterning said second sacrificial layer so as to expose part of portions of said third material film that correspond to said thermal detector;

forming a fourth material film on the surface of said second sacrificial layer and on exposed surfaces of said third material film;

forming a fifth material film over the entire surface of said fourth material film for forming said metal thin film of said infrared photosensitive area;

patterning said fourth and fifth material films so as to expose a portion of said second sacrificial layer and forming: said shield that is constituted by a portion of said fourth material film; and said metal thin-film that is constituted by a portion of said fifth material film; and removing said first and second sacrificial layers.

28. A method of fabricating a thermal infrared detector according to claim 27 wherein polyimide is used as the material of said first and second sacrificial layers.

* * * * *